United States Patent
Huang et al.

(10) Patent No.: US 12,298,417 B2
(45) Date of Patent: May 13, 2025

(54) POSITIONING SIGNAL PROCESSING METHOD AND APPARATUS

(71) Applicant: HUAWEI TECHNOLOGIES CO., LTD., Shenzhen (CN)

(72) Inventors: Su Huang, Shanghai (CN); Li Zhang, Beijing (CN); Jiantao Xue, Beijing (CN); Xin Gao, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 22 days.

(21) Appl. No.: 17/960,166

(22) Filed: Oct. 5, 2022

(65) Prior Publication Data
US 2023/0037478 A1 Feb. 9, 2023

Related U.S. Application Data

(63) Continuation of application No. PCT/CN2021/086496, filed on Apr. 12, 2021.

(30) Foreign Application Priority Data

Apr. 10, 2020 (CN) .......................... 202010281208.0

(51) Int. Cl.
*G01S 5/00* (2006.01)
*H04L 5/00* (2006.01)
*H04L 27/26* (2006.01)

(52) U.S. Cl.
CPC ............ *G01S 5/009* (2013.01); *H04L 5/0051* (2013.01); *H04L 27/26025* (2021.01)

(58) Field of Classification Search
CPC .. G01S 5/009; H04L 27/26025; H04L 5/0051
See application file for complete search history.

(56) References Cited

U.S. PATENT DOCUMENTS

2020/0028648 A1    1/2020   Akkarakaran et al.
2022/0373635 A1* 11/2022   Bao ..................... G01S 5/0236

FOREIGN PATENT DOCUMENTS

| CN | 107360617 A | 11/2017 |
|---|---|---|
| CN | 110635876 A | 12/2019 |

(Continued)

OTHER PUBLICATIONS

Huawei et al: "Maintenance of DL PRS for NR positioning", 3GPP Draft; R1-2000190,Feb. 15, 2020, XP052343306, total 15 pages.

(Continued)

*Primary Examiner* — Curtis B Odom
(74) *Attorney, Agent, or Firm* — HAUPTMAN HAM, LLP

(57) ABSTRACT

A positioning signal processing method includes receiving positioning reference signal (PRS) configuration information from a positioning device. A PRS is received as a PRS resource set. Each PRS resource set includes one or more PRSs. One access network device corresponds to one or more PRS resource sets. The positioning signal processing method further includes determining PRS time domain information based on the PRS configuration information. The time domain information includes a periodicity (P) of the PRS and a symbol length of the PRS in the P. The positioning signal processing method further includes receiving a plurality of PRSs based on the PRS time domain information.

17 Claims, 10 Drawing Sheets

(56) References Cited

FOREIGN PATENT DOCUMENTS

JP  2023521289 A  5/2023
WO  2016032219 A1  3/2016

OTHER PUBLICATIONS

Intel Corporation: "Output of email thread [1 OOe-NR-Pos-DL PRS-02]", 3GPP Draft; R1-2001235,Mar. 5, 2020, XP052344300, total 19 pages.
Huawei et al: "Maintenance of DL PRS for NR positioning", 3GPP Draft; R1-2001558,Apr. 11, 2020, XP052341642, total 9 pages.
Intel Corporation: "Offline Discussion Outcome on DL Reference Signals for NR Positioning",3GPP Draft; R1-1905847,Apr. 15, 2019, XP051707893,total 12 pages.
ZTE: "Discussion on NR positioningsignals", 3GPP Draft; R1-1903901 ,Apr. 3, 2019, pp. 1-6, XP051707055.
Extended European Search Report issued in corresponding European Application No. 21784222.8, dated Aug. 21, 2023, pp. 1-12.
Qualcomm Incorporated, On UE Rx-Tx time difference measurements for NR positioning. 3GPP TSG-RAN WG4 Meeting #94-e, Online, Feb. 24-Mar. 6, 2020, R4-2000733, 15 pages.
Oppo, Remaining Issues on DL Positioning Reference Signal. 3GPP TSG RAN WG1 #100, e-Meeting, Feb. 24-Mar. 6, 2020, R1-2000462, 7 pages.
Japanese Office Action issued in corresponding Japanese Application No. 2022-561399, dated Nov. 21, 2023, pp. 1-7.
Intel Corporation, "Feature Lead Summary #1 on AI 7.2.10.1—DL Reference Signals for NR Positioning R1-1913285", 3GPP TSG RAN WG1 Meeting #99, Nov. 22, 2019, total 26 pages.
Huawei et al., "Remaining issues on DL PRS for NR positioning R1-1911896", 3GPP TSG RAN WG1 Meeting #99,Nov. 22, 2019,total 8 pages.

3GPP TS 38.133 V16.3.0:"3rd Generation Partnership Project;Technical Specification Group Radio Access Network;NR;Requirements for support of radio resource management(Release 16)",Mar. 2020, total 1170 pages.
3GPP TS 37.355 V16.0.0:"3rd Generation Partnership Project;Technical Specification Group Radio Access Network;LTE Positioning Protocol (LPP)(Release 16)",Mar. 2020, total 281 pages.
3GPP TS 38.214 V16.1.0 :"3rd Generation Partnership Project;Technical Specification Group Radio Access Network;NR;Physical layer procedures for data(Release 16)",Mar. 2020, total 151 pages.
3GPP TS 38.215 V16.1.0:"3rd Generation Partnership Project;Technical Specification Group Radio Access Network;NR;Physical layer measurements(Release 16)",Mar. 2020, total 22 pages.
3GPP TS 38.306 V16.0.0 (Mar. 2020), 3rd Generation Partnership Project; Technical Specification Group Radio Access Network; NR; User Equipment (UE) radio access capabilities (Release 16),total 63 pages.
3GPP TSG RAN WG1 Meeting #98bis,R1-1910033,DL PRS design for NR positioning, Huawei, HiSilicon,Chongqing, China, Oct. 14-20, 2019,total 13 pages.
3GPP TSG RAN WG1 Meeting #99, R1-1911896,Remaining issues on DL PRS for NR positioning,Huawei, HiSilicon, Reno, USA, Nov. 18-22, 2019,total 8 pages.
3GPP TSG RAN WG1 Meeting #100-e ,R1-2000190, Maintenance of DL PRS for NR positioning,Huawei, HiSilicon, Feb. 24-Mar. 6, 2020,total 15 pages.
International Search Report issued in corresponding International Application No. PCT/CN2021/086496, mailed Jul. 8, 2021, pp. 1-9.
WI Rapporteur (Intel Corporation):"RAN1 Agreements on NR Positioning".3GPP TSG RAN WG1 Meeting #99, Reno, US, Nov. 18-22, 2019, R1-1913606, total 47 pages.
Japanese Notice of Allowance issued in corresponding Japanese Application No. 2022-561399, dated Jun. 25, 2024, pp. 1-3.

* cited by examiner

POSITIONING SIGNAL PROCESSING METHOD AND APPARATUS

CROSS-REFERENCE TO RELATED APPLICATIONS

This application is a continuation of International Application No. PCT/CN2021/086496, filed on Apr. 12, 2021, which claims priority to Chinese Patent Application No. 202010281208.0, filed on Apr. 10, 2020. The disclosures of the aforementioned applications are hereby incorporated by reference in their entireties.

TECHNICAL FIELD

This application relates to the field of positioning technologies, and in particular, to a positioning signal processing method and an apparatus.

BACKGROUND

Positioning of long term evolution (Long Term Evolution, LTE) and new radio (New Radio, NR) is based on an architecture in which a core-network location management function (Location management function, LMF) performs control, and an access network and a terminal provide assistance. In addition, a downlink positioning reference signal (Downlink Positioning reference signal, DL PRS) is defined to support the following positioning technologies:

Downlink time difference of arrival (Downlink Observation Arrival Time Difference, DL-TDOA) positioning technology: UE measures a downlink reference signal time difference (Downlink Reference Signal Time Difference, DL RSTD) of positioning reference information (positioning reference signal, PRS) of each cell and reports a measurement result to the LMF.

Downlink angle of departure (Downlink Angle of Departure, DL-AoD) positioning technology: UE measures reference signal received power (PRS Reference Signal Received Power, PRS-RSRP) of a PRS signal of each cell and reports a measurement result to the LMF.

Multi-round trip time (Multi Round-Trip-Time, Multi-RTT) positioning technology: UE measures a UE Rx-Tx time difference (Rx-Tx time difference) of a PRS signal of each cell, and reports a measurement result to the LMF. Each cell measures a gNB Rx-Tx time difference of a sounding reference signal (Sounding reference signal, SRS) signal of the UE, and reports a measurement result to the LMF.

To support the foregoing positioning methods, a terminal needs to have a capability of receiving and processing a DL PRS. After the terminal receives PRS configuration information sent by a positioning device, how to accurately receive the PRS based on the PRS configuration information and a capability of the terminal is a problem that urgently needs to be resolved.

SUMMARY

Embodiments of this application provide a positioning signal processing method and an apparatus, to implement that a terminal accurately receives a PRS.

According to a first aspect, a positioning signal processing method is provided, where the method includes:

receiving positioning reference signal PRS configuration information sent by a positioning device, where a PRS is sent in a form of a PRS resource set, each PRS resource set includes one or more PRSs, and one access network device corresponds to one or more PRS resource sets; determining PRS time domain information based on the PRS configuration information, where the time domain information includes a periodicity P of the PRS and a symbol length K of the PRS in the periodicity P; and receiving the plurality of PRSs based on the PRS time domain information.

In this embodiment of this application, the PRS time domain information is obtained through calculation based on the obtained PRS configuration information delivered by the positioning device, and then a terminal receives, based on the PRS time domain information, the PRS sent by the access network device. This ensures accuracy and reliability of receiving the PRS by the terminal.

In a possible implementation, the method further includes: reporting processing capability information of the terminal, and the receiving the plurality of PRSs based on the PRS time domain information includes: receiving the PRS based on the processing capability information and the time domain information.

In a possible implementation, the processing capability information includes one or more combinations of capability information, and each combination of capability information indicates that the terminal can process an N-millisecond PRS within a time period of T milliseconds. The receiving the PRS based on the processing capability information and the time domain information specifically includes: comparing the time domain information with the one or more combinations of capability information, to determine that a first combination of capability information exists, so that the terminal receives the PRS in a range of the first combination of capability information.

In a possible implementation, the range of the first combination of capabilities satisfies the following rules: T≤P, and N≥K.

In a possible implementation, the method further includes: when the first combination of T and N does not exist and T≤P and N≥K are satisfied, if a second combination of T and N exists, and N≥K is satisfied, receiving the PRS based on T and N.

In a possible implementation, the method further includes: when at least one combination of T and N does not exist and T≤P and N≥K are satisfied, if the second combination of T and N exists and T≤P is satisfied, receiving the PRS based on the second combination of P and N.

In a possible implementation, the receiving, by the terminal, the PRS based on the second combination of P and N includes:

receiving, by the terminal within a processing capability time T in each periodicity P, a PRS with a length of N; and receiving a PRS with a total length of K by ceil $$\left(\frac{K}{N}\right)$$

the periodicity P, where N<K, and ceil( ) indicates rounding up.

In this embodiment of this application, the terminal compares the obtained PRS time domain information configured by the positioning device with the processing capability information reported by the terminal, to determine a manner in which the terminal receives the PRS delivered by the access network device, so that the terminal supports, based on an actual capability, a PRS resource configured by the positioning device. This improves efficiency of receiving the PRS by the terminal.

According to a second aspect, a positioning signal processing method is provided, where the method includes:
sending positioning reference signal PRS configuration information to a terminal, where a PRS exists in a form of a PRS resource set, each PRS resource set includes one or more PRSs, and one access network device corresponds to one or more PRS resource sets; sending a measurement result request to the terminal; and receiving measurement results corresponding to the plurality of PRSs sent by the terminal, and positioning the terminal based on the measurement results corresponding to the plurality of PRSs, where the measurement results are obtained by the terminal based on PRS time domain information corresponding to the PRS configuration information, and the PRS time domain information includes a periodicity P of the PRS and a symbol length K of the PRS in the periodicity P.

According to a third aspect, a positioning signal processing method is provided, where the method includes:
receiving a PRS measurement window configuration sent by a positioning device, where the PRS measurement window configuration includes a receiving periodicity and window duration in the receiving periodicity, and the window duration is used for receiving a PRS; and receiving a PRS based on the measurement window configuration.

In a possible implementation, the PRS measurement window configuration further includes an offset used to determine a time interval from the window duration to a start moment of the receiving periodicity.

In a possible implementation, the method further includes:
determining, by a terminal, the offset based on the receiving periodicity, where the offset is less than the receiving periodicity.

In a possible implementation, the terminal obtains first duration from a to-be-received start PRS symbol on a target frequency to the start moment of the receiving periodicity, and uses the first duration as the offset.

In a possible implementation, the receiving a PRS based on the measurement window configuration includes:
obtaining a target measurement window configuration based on a target frequency, a target frequency band, a target frequency range, or a terminal identifier corresponding to the terminal, and receiving the PRS based on the target measurement window configuration.

According to a fourth aspect, a positioning signal processing method is provided, where the method includes:
sending a PRS measurement window configuration to a terminal, where the PRS measurement window configuration includes a receiving periodicity and window duration in the receiving periodicity, and the window duration is used for receiving a PRS.

In a possible implementation, before the sending a PRS measurement window configuration to a terminal, the method further includes:
obtaining PRS configuration information, and determining PRS time domain information based on the PRS configuration information, where the time domain information includes a periodicity P of the PRS and a symbol length K of the PRS in the periodicity P; and setting the PRS measurement window configuration based on the time domain information.

It can be learned that in this embodiment of this application, a positioning device obtains the PRS time domain information through calculation based on the PRS configuration information, compares the PRS time domain information with processing capability information reported by the terminal, and determines a measurement window configuration parameter based on a comparison result. The measurement window configuration can be flexibly applied to different terminals, and the measurement window configuration can be better adapted to a capability of the terminal, improving efficiency of receiving the PRS by the terminal based on the measurement window configuration.

In a possible implementation, the determining PRS time domain information based on the PRS configuration information includes one or more of the following methods: determining a common sending periodicity of a plurality of PRS resource sets corresponding to a plurality of access network devices as P; determining a common sending periodicity of first PRS resource sets corresponding to each access network device in the plurality of access network devices as P; determining a sending periodicity of a first PRS resource set corresponding to a first access network device in the plurality of access network devices as P, where the sending periodicity of the first PRS resource set corresponding to the first access network device is a common divisor of sending periodicities of the first PRS resource sets corresponding to each access network device in the plurality of access network devices; determining a greatest common divisor of the sending periodicities of the first PRS resource sets corresponding to each access network device in the plurality of access network devices as P; determining a greatest common divisor of sending periodicities of a plurality of PRS resource sets corresponding to each access network device in the plurality of access network devices as P; determining a least common multiple of the sending periodicities of the first PRS resource sets corresponding to each access network device in the plurality of access network devices as P; or determining a least common multiple of the sending periodicities of the plurality of PRS resource sets corresponding to each access network device in the plurality of access network devices as P.

In this embodiment of this application, the periodicity P of the PRS in a PRS configuration received by the terminal is determined by comprehensively referring to periodicities of the plurality of PRS resource sets corresponding to the plurality of access network devices. Therefore, a PRS resource set of each TRP is comprehensively considered for the determined periodicity, ensuring reliability of the determined periodicity P.

In a possible implementation, the first PRS resource set of the access network device is:
the $1^{st}$ PRS resource set on a PRS resource set list included in the access network device; or a PRS resource set with a smallest resource set index value on the PRS resource set list included in the access network device.

In a possible implementation, the determining time domain information corresponding to the PRS includes:
using a PRS symbol length, in a first slot set, corresponding to the PRS as a symbol length K of the PRS in the periodicity P, where the first slot set includes a plurality of slots, and the plurality of slots are used to transmit all PRSs detected by the terminal device within duration corresponding to P.

In a possible implementation, the plurality of slots in the first slot set are consecutive slots.

In a possible implementation, a quantity of the consecutive slots is a minimum quantity of slots required for sending all the PRSs.

In a possible implementation, the method further includes: the determining a symbol length K of the PRS in the first slot set specifically includes: determining a first symbol length of a PRS in each slot in the first slot set; and determining the symbol length K of the PRS in the first slot set based on the first symbol length.

In a possible implementation, the determining a first symbol length of a PRS in each slot in the first slot set includes: determining a start moment and an end moment of each slot in the first slot set; and determining the first symbol length of the PRS in each slot based on the start moment and the end moment.

In a possible implementation, the determining the first symbol length of the PRS in each slot based on the start moment and the end moment includes:
determining the first symbol length of the PRS in each slot based on an OFDM symbol determined at a PRS subcarrier spacing corresponding to the start moment and an OFDM symbol determined at a PRS subcarrier spacing corresponding to the end moment.

In a possible implementation, the first symbol length of the PRS satisfies the following formula:

$$K_s = \frac{1}{2^\mu N_{symb}^{slot}} \left( \text{ceil}\left(2^\mu N_{symb}^{slot} T_s^{end}\right) - \text{floor}\left(2^\mu N_{symb}^{slot} T_s^{start}\right) \right)$$

where s is a slot index in a first slot set S, $K_s$ represents a first symbol length of a PRS in a slot s, $\mu$ is a subcarrier spacing corresponding to the PRS, $N_{symb}^{slot}$ is a quantity of symbols in one slot, $T_s^{start}$ is a start moment in the slot s, and $T_s^{end}$ is an end moment in the slot s.

In a possible implementation, the determining the first symbol length of the PRS in each slot based on the start moment and the end moment includes:
obtaining a time interval between the start moment and the end moment; and determining the first symbol length of the PRS in each slot based on a symbol length corresponding to an OFDM symbol determined at a PRS subcarrier spacing corresponding to the time interval.

In a possible implementation, the first symbol length of the PRS satisfies the following formula:

$$K_s = \frac{1}{2^\mu N_{symb}^{slot}} \text{ceil}\left(2^\mu N_{symb}^{slot}\left(T_s^{end} - T_s^{start}\right)\right)$$

where s is a slot index in a first slot set S, $K_s$ represents a first symbol length of a PRS in a slot s, $\mu$ is a subcarrier spacing corresponding to the PRS, $N_{symb}^{slot}$ is a quantity of symbols in one slot, $T_s^{start}$ is a s tart moment in the slot s, and $T_s^{end}$ is an end moment in the slot s.

In this embodiment of this application, the first slot set including slots in the periodicity P is obtained, and then the first symbol length for transmitting the PRS in the slot is determined based on a start moment and an end moment of transmitting the PRS in a single slot in the first slot set. Then, the symbol length of the PRS in the first slot set is obtained based on the first symbol length, and the symbol length K of the PRS corresponding to the periodicity P is calculated in the process, thereby ensuring comprehensiveness and integrity of an obtained result.

In a possible implementation, the time interval between the start moment and the end moment includes a range in which all PRS symbols sent by all access network devices in the slot appear.

In a possible implementation, the time interval between the start moment and the end moment is a minimum time interval that includes a range in which all the PRS symbols sent by all the access network devices in the slot appear.

In a possible implementation, the range in which all the PRS symbols sent by all the access network devices in the slot appear is a union set of ranges in which all PRS symbols sent by each access network device appear. The range in which all the PRS symbols sent by each access network device is determined based on an expected reference signal receiving time difference, an uncertain range of an expected reference signal receiving time difference, a symbol index occupied by the PRS, and a quantity of symbols sent by each access network device.

In this embodiment of this application, the first slot set including slots, in the periodicity P, that are used to transmit the PRS is obtained, and then the first symbol length for transmitting the PRS in the slot is determined based on a start moment and an end moment of transmitting the PRS in a single slot in the first slot set. Then, the symbol length of the PRS in the first slot set is obtained based on the first symbol length, and the symbol length K of the PRS corresponding to the periodicity P is calculated in the process, thereby ensuring accuracy of an obtained result.

In a possible implementation, the determining the symbol length K of the PRS in the first slot set based on the first symbol length includes:
performing summation on first symbol lengths of PRSs in each slot to obtain the symbol length K of the PRSs in the first slot set; or using a maximum value in the first symbol lengths of the PRSs in each slot as second symbol lengths of PRSs in each slot; and performing summation on the second symbol lengths of the PRSs in each slot to obtain the symbol length K of the PRSs in the first slot set.

In a possible implementation, the symbol length K of the PRS in the first slot set satisfies the following formula:

$$K = \sum_{s \in S} K_s$$

where s is the slot index in the first slot set S, $K_s$ represents the first symbol length of the PRS in the slot s, and K represents the symbol length of the PRS; or $$K = K_m |S|, K_m = \max_{s \in S}(K_s)$$

where s is the slot index in the first slot set S, $K_s$ represents the first symbol length of the PRS in the slot s, K represents the symbol length of the PRS, $K_m$ represents a maximum value in the first symbol lengths of the PRSs in the first slot set, and II represents taking a quantity of elements in the set.

In a possible implementation, the determining the symbol length K of the PRS in the first slot set includes:
determining slot lengths corresponding to slots in the first slot set; and performing summation on the slot lengths corresponding to the slots to obtain the symbol length K of the PRS in the first slot set.

In a possible implementation, the symbol length K of the PRS in the first slot set satisfies the following formula:

$$K = \frac{|S|}{2^\mu}$$

where K represents the symbol length of the PRS, ∥ represents taking a quantity of elements in the set, and µ represents a subcarrier spacing corresponding to the PRS.

In a possible implementation, the setting the PRS measurement window configuration based on the time domain information includes:

receiving processing capability information reported by the terminal, and setting the PRS measurement window configuration based on a result of comparison between the processing capability information and the time domain information.

In a possible implementation, the processing capability information includes one or more combinations of capability information, and the capability information indicates that the terminal can process an N-millisecond PRS within a time period of T milliseconds.

The setting the PRS measurement window configuration based on the result of comparison between the processing capability information and the time domain information includes: comparing the time domain information with the plurality of combinations of capability information, so that the terminal sets, within a range of at least one combination of capabilities, the PRS measurement window configuration based on the at least one combination of capabilities.

In a possible implementation, the range of the at least one combination of capabilities satisfies the following rules:
T≤P, and N≥K.

In a possible implementation, when the first combination of T and N does not exist and T≤P and N≥K are satisfied, if a second combination of T and N exists and N≥K is satisfied, the PRS measurement window configuration is set based on the second combination of P and N.

In a possible implementation, when at least one combination of T and N does not exist and T≤P and N≥K are satisfied, if the second combination of T and N exists and T≤P is satisfied, the PRS measurement window configuration is set based on the second combination of P and N.

In a possible implementation, the measurement window configuration may be provided per frequency, per frequency band, per frequency range, or per terminal.

According to a fifth aspect, a communication apparatus is provided. The apparatus includes at least one module configured to implement the communication method according to any one of the first aspect or the possible implementations of the first aspect, or includes at least one module configured to implement the communication method according to any one of the third aspect or the possible implementations of the third aspect.

According to a sixth aspect, a communication apparatus is provided. The apparatus includes at least one module configured to implement the communication method according to any one of the second aspect or the possible implementations of the second aspect, or includes at least one module configured to implement the communication method according to any one of the fourth aspect or the possible implementations of the fourth aspect.

According to a seventh aspect, a communication apparatus including at least one processor is provided, and the at least one processor is coupled to at least one memory.

The at least one processor is configured to execute a computer program or instructions stored in the at least one memory, so that the apparatus is enabled to perform the method according to any one of the implementations of the first aspect; the method according to any one of the implementations of the second aspect; the method according to any one of the implementations of the third aspect, or the method according to any one of the implementations of the fourth aspect.

The apparatus may be a terminal, or may be a chip included in the terminal. Functions of the communication equipment may be implemented by hardware, or may be implemented by hardware executing corresponding software. The hardware or software includes one or more modules corresponding to the functions.

The apparatus may be a positioning device, or may be a chip included in the positioning device. Functions of the communication equipment may be implemented by hardware, or may be implemented by hardware executing corresponding software. The hardware or software includes one or more modules corresponding to the functions.

In a possible design, a structure of the apparatus includes a processing module and a transceiver module, where the processing module is configured to support the apparatus in performing the method according to any one of the first aspect or the possible implementations of the first aspect; or perform the method according to any one of the second aspect or the possible implementations of the second aspect.

In another possible design, a structure of the apparatus includes a processor, and may further include a memory. The processor is coupled to the memory, and may be configured to execute the computer program or the instructions stored in the memory, so that the apparatus is enabled to perform the method according to any one of the first aspect or the possible implementations of the first aspect, or performs the method in any one of the second aspect or the possible implementations of the second aspect. Optionally, the apparatus further includes a communication interface, and the processor is coupled to the communication interface. When the apparatus is a network device, the communication interface may be a transceiver or an input/output interface. When the apparatus is a chip included in a network device, the communication interface may be an input/output interface of the chip. Optionally, the transceiver may be a transceiver circuit, and the input/output interface may be an input/output circuit.

According to an eighth aspect, an embodiment of this application provides a chip system, including a processor, where the processor is coupled to a memory. The memory is configured to store a program or instructions. When the program or the instructions are executed by the processor, the chip system is enabled to implement the method according to any one of the first aspect or the possible implementations of the first aspect, or the method according to any one of the second aspect or the possible implementations of the second aspect, the method according to any one of the third aspect or the possible implementations of the third aspect, or the method according to any one of the fourth aspect or the possible implementations of the fourth aspect.

Optionally, the chip system further includes an interface circuit, and the interface circuit is configured to exchange a code instruction with the processor.

Optionally, there may be one or more processors in the chip system, and the processor may be implemented by hardware or by software. When the processor is implemented by the hardware, the processor may be a logic circuit, an integrated circuit, or the like. When the processor is implemented by the software, the processor may be a general-purpose processor, and is implemented by reading software code stored in the memory.

Optionally, there may be one or more memories in the chip system. The memories may be integrated with the processor, or may be disposed separately from the processor. This is not limited in this application. For example, the memory may be a non-transitory processor, for example, a read-only memory ROM. The memory and the processor may be integrated into a same chip, or may be separately disposed on different chips. A type of the memory and a manner of disposing the memory and the processor are not specifically limited in this application.

According to a ninth aspect, an embodiment of this application provides a computer-readable storage medium. The computer-readable storage medium stores a computer program or instructions. When the computer program or the instructions are executed, a computer is enabled to perform the method according to any one of the first aspect or the possible implementations of the first aspect, the method according to any one of the second aspect or the possible implementations of the second aspect, the method according to any one of the third aspect or the possible implementations of the third aspect, or the method according to any one of the fourth aspect or the possible implementations of the fourth aspect.

According to a tenth aspect, an embodiment of this application provides a computer program product. When a computer reads and executes the computer program product, the computer is enabled to perform the method according to any one of the first aspect or the possible implementations of the first aspect, the method according to any one of the second aspect or the possible implementations of the second aspect, the method according to any one of the third aspect or the possible implementations of the third aspect, or the method according to any one of the fourth aspect or the possible implementations of the fourth aspect.

According to an eleventh aspect, an embodiment of this application provides a communication system. The communication system includes the foregoing one or more terminal devices or positioning devices. Optionally, the communication system may further include one or more access network devices.

BRIEF DESCRIPTION OF DRAWINGS

To describe the technical solutions in embodiments of this application or in a conventional technology more clearly, the following briefly describes the accompanying drawings used in embodiments.

DESCRIPTION OF EMBODIMENTS

The following describes the technical solutions in embodiments of this application with reference to the accompanying drawings in embodiments of this application.

The technical solutions in embodiments of this application may be applied to various communication systems such as a long term evolution (long term evolution, LTE) system, an LTE frequency division duplex (frequency division duplex, FDD) system, an LTE time division duplex (time division duplex, TDD) system, a fifth generation (5th generation, 5G) system, a new radio (new radio, NR), or a next-generation communication system, for example, 6G. 5G mobile communication systems in this application include a 5G mobile communication system of non-standalone (non-standalone, NSA) networking or a 5G mobile communication system of standalone (standalone, SA) networking. The technical solutions provided in this application may be further applied to a future communication system, for example, a 6th generation mobile communication system. The communication system may be alternatively a public land mobile network (public land mobile network, PLMN) network, a device-to-device (device-to-device, D2D) communication system, a machine to machine (machine to machine, M2M) communication system, an internet of things (Internet of Things, IoT), an internet of vehicles communication system, or another communication system.

Figure 1A:
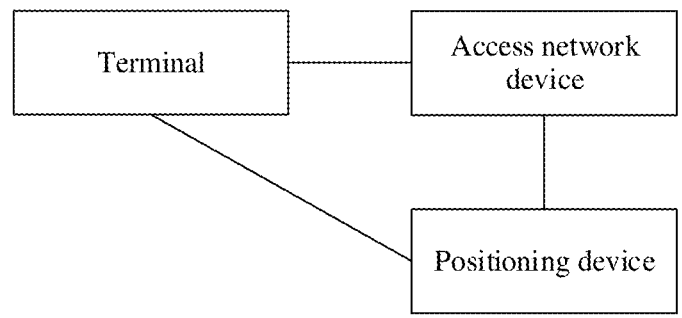
FIG. 1A is a schematic diagram of an architecture of a positioning system to which a terminal positioning method according to an embodiment of this application is applied.

FIG. 1A is a schematic diagram of an architecture of a positioning system to which a terminal positioning method according to an embodiment of this application is applied. As shown in FIG. 1A, the positioning system includes a terminal, one or more access network devices (one access network device is used as an example for illustration in FIG. 1A), and a positioning device. The terminal, the access network device, or the positioning device may directly communicate with each other, or may communicate with each other through forwarding by another device. This is not specifically limited in this embodiment of this application. Although not shown, the positioning system may further include another network element such as a mobility management network element. This is not specifically limited in this embodiment of this application.

Optionally, the positioning device in this embodiment of this application may be a location management function (location management function, LMF) network element or a location management component (location management component, LMC) network element, or may be a local location management function (local location management function, LLMF) network element located in a network device.

Optionally, the positioning system provided in this embodiment of this application may be applied to the foregoing communication systems. For example, the positioning system is applied to a 5G mobile communication system. A network element or an entity corresponding to the access network device in FIG. 1A may be a next-generation radio access network (next-generation radio access network, NG-RAN) device in the 5G mobile communication system. The network element or entity corresponding to the foregoing mobility management network element may be an access and mobility management function (access and mobility management function, AMF) network element in the 5G mobile communication system. This is not specifically limited in this embodiment of this application.

Figure 1B:
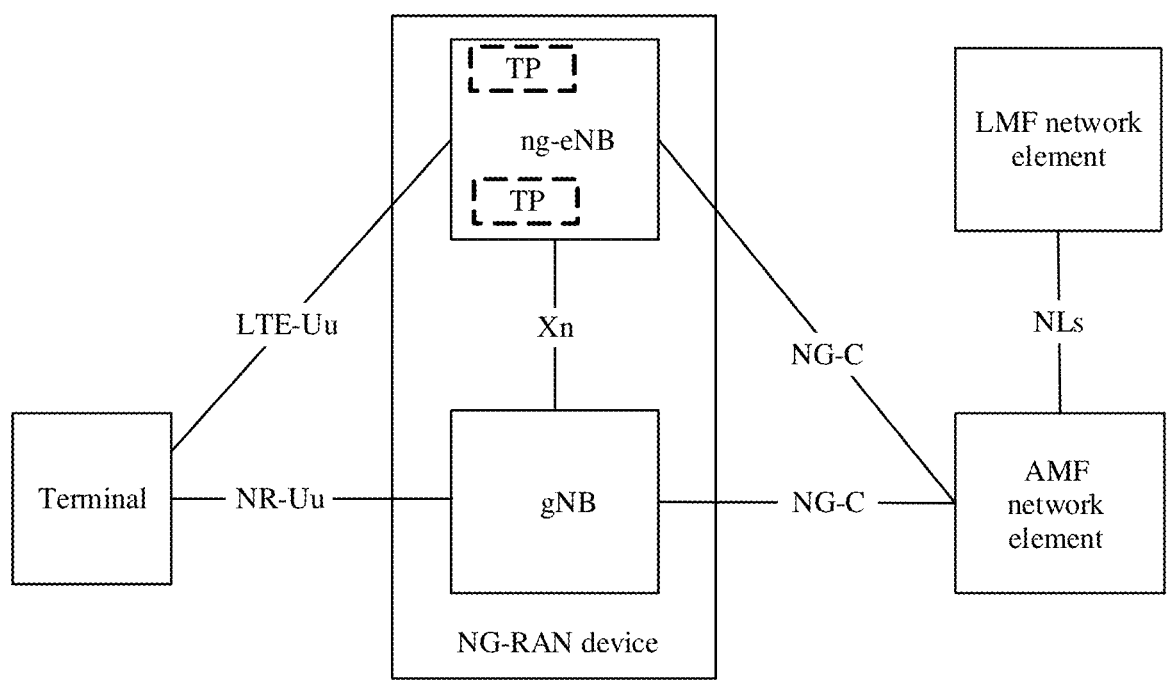
FIG. 1B is a schematic diagram of an architecture of a positioning system, in a 5G mobile communication system, to which a terminal positioning method according to an embodiment of this application is applied.

For example, FIG. 1B is a schematic diagram of an architecture of a positioning system, in the 5G mobile communication system, to which a terminal positioning method according to an embodiment of this application is applied. As shown in FIG. 1B, in the positioning system, a terminal is connected to a radio access network via a next-generation evolved NodeB (next-generation evolved NodeB, ng-eNB) through an LTE-Uu interface or via a next-generation NodeB (next-generation NodeB, gNB) through an NR-Uu interface. The radio access network is connected to a core network via an AMF network element by using an NG-C interface. The NG-RAN includes one or more ng-eNBs (one ng-eNB is used as an example for illustration in FIG. 1B); the NG-RAN may also include one or more gNBs (one gNB is used as an example for illustration in FIG. 1B), and the NG-RAN may further include one or more ng-eNBs and one or more gNBs. The ng-eNB is an LTE base station that accesses a 5G core network, and the gNB is a 5G base station that accesses the 5G core network. The core network includes an AMF network element and an LMF network element. The AMF network element is used to implement functions such as access management, and the LMF network element is used to implement functions such as positioning or positioning assistance. The AMF network element and the LMF network element are connected through an NLs interface.

Figure 1C:
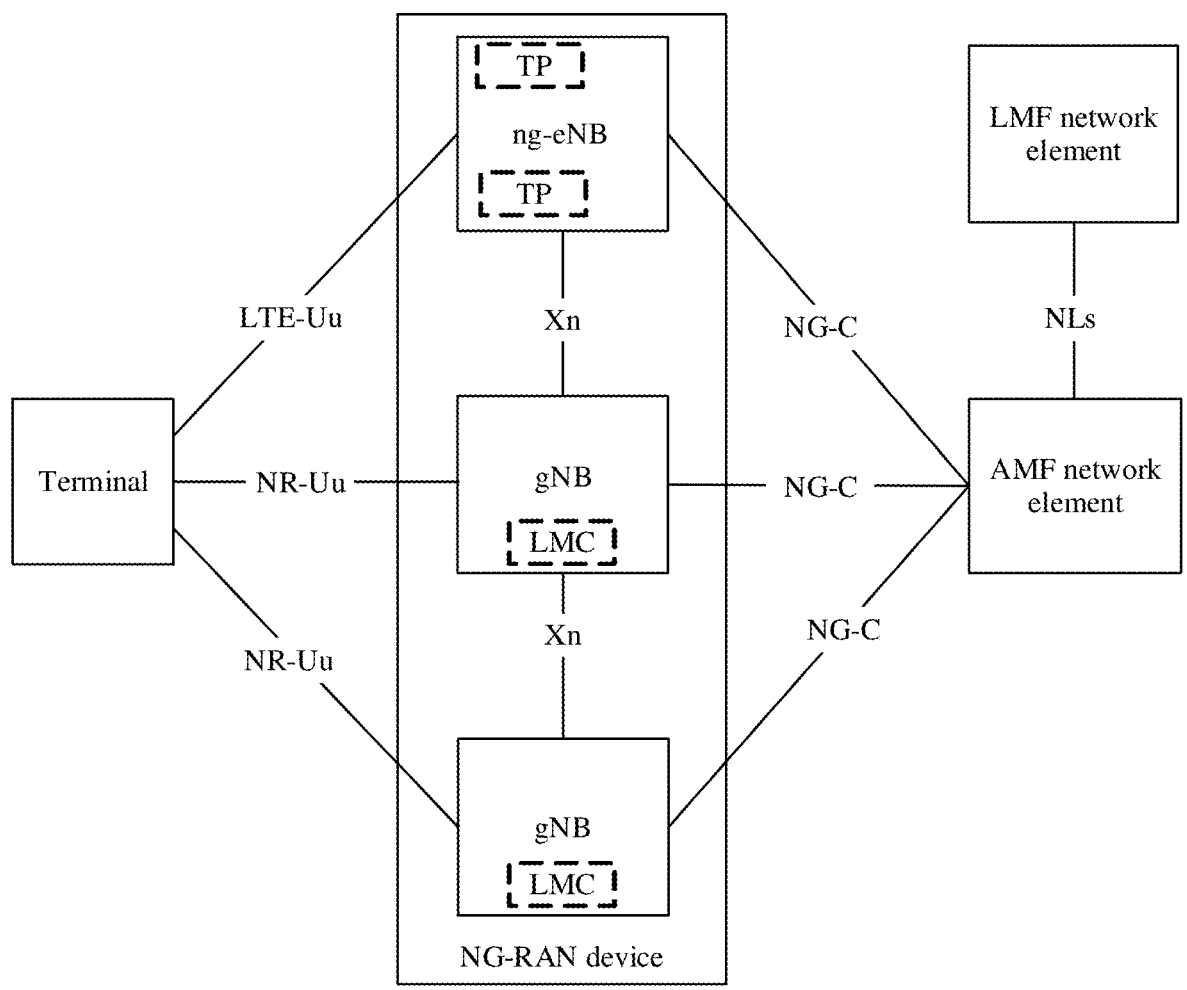
FIG. 1C is a schematic diagram of an architecture of another positioning system, in a 5G mobile communication system, to which a positioning method according to an embodiment of this application is applied.

For example, FIG. 1C is a schematic diagram of an architecture of another positioning system, in the 5G mobile communication system, to which a positioning method according to an embodiment of this application is applied. A difference between the architectures of the positioning systems in FIG. 1C and FIG. 1B lies in that the apparatus or component (for example, the LMF network element) that implements a positioning management function in FIG. 1B is deployed in the core network, whereas the apparatus or component (for example, the LMC network element) that implements the positioning management function in FIG. 1C may be deployed in an NG-RAN device. As shown in FIG. 1C, the gNB includes the LMC network element, where the LMC network element is part of functional components of the LMF network element and may be integrated into the gNB of the NG-RAN device.

It should be understood that the device or functional node included in the positioning system in FIG. 1B or FIG. 1C is merely an example for description, and does not constitute a limitation on embodiments of this application. In actual application, the positioning system in FIG. 1B or FIG. 1C may further include another network element, device, or functional node that has an interaction relationship with the device or functional node shown in the figure, which is not specifically limited herein.

Optionally, the terminal in embodiments of this application may be an access terminal, a subscriber unit, a subscriber station, a mobile station, a relay station, a remote station, a remote terminal, a mobile device, a user terminal (user terminal), user equipment (user equipment, UE), a terminal (terminal), a wireless communication device, a user agent, a user apparatus, a cellular phone, a cordless phone, a session initiation protocol (session initiation protocol, SIP) phone, a wireless local loop (wireless local loop, WLL) station, a personal digital assistant (personal digital assistant, PDA), a handheld device having a wireless communication function, a computing device or another processing device connected to a wireless modem, a vehicle-mounted device, a wearable device, a terminal in a future 5G network, a terminal in a future evolved PLMN, a terminal in a future internet of vehicles, or the like. This is not limited in embodiments of this application.

As an example rather than a limitation, in embodiments of this application, the terminal may be a mobile phone, a tablet computer, a computer with a wireless transceiver function, a virtual reality terminal, an augmented reality terminal, a wireless terminal in industrial control, a wireless terminal in unmanned driving, a wireless terminal in remote surgery, a wireless terminal in a smart grid, a wireless terminal in transportation security, a wireless terminal in a smart city, a wireless terminal in a smart home, or the like.

By way of example, and not limitation, in embodiments of this application, the wearable device may also be referred to as a wearable intelligent device, which is a general term of wearable devices developed from daily wear that is intelligently designed by using a wearable technology, for example, glasses, gloves, watches, clothing, and shoes. The wearable device is a portable device that is directly worn on a body or integrated into clothes or an accessory of a user. The wearable device is not merely a hardware device, but is used to implement a powerful function through software support, data interaction, and cloud interaction. In a board sense, wearable intelligent devices include full-featured and large-sized devices that can implement complete or partial functions without depending on smartphones, such as smartwatches or smart glasses, and devices that focus on only one type of application function and need to work with other devices such as smartphones, such as various smart bands or smart jewelry for monitoring physical signs.

In addition, in embodiments of this application, the terminal may be alternatively a terminal in an internet of things (internet of things, IoT) system. The IoT is an important component of future development of information technologies, and a main technical feature of the IoT is that objects are connected to a network by using a communication technology, to implement an intelligent network of human-computer interconnection and interconnection of things. In embodiments of this application, the IoT technology may implement mass connection, intensive coverage, and terminal power saving by using a narrow band (narrow band, NB) technology or the like.

In addition, in embodiments of this application, the terminal may further include sensors such as an intelligent printer, a train detector, and a gas station. Main functions of the terminal include: data collection (some terminals), receiving of control information and downlink data of the access network device, sending of an electromagnetic wave, and transmission of uplink data to the access network device.

Optionally, the access network device in embodiments of this application may be any communication device having a wireless transceiver function that is configured to communicate with the terminal. The access network device includes but is not limited to an evolved NodeB (evolved NodeB, eNB), a baseband unit (baseband unit, BBU), an access point (access point, AP) in a wireless fidelity (wireless fidelity, Wi-Fi) system, a wireless relay node, a wireless backhaul node, a transmission point (transmission point, TP), a transmission reception point (transmission reception point, TRP), or the like. The access network device may be alternatively a gNB, a TRP, or a TP in a 5G system, or one antenna panel or one group of antenna panels (including a plurality of antenna panels) of a base station in the 5G system. In addition, the access network device may be alternatively a network node that constitutes a gNB or a TP, for example, a BBU or a distributed unit (distributed unit, DU).

In some deployments, the gNB may include a centralized unit (centralized unit, CU) and a DU. In addition, the gNB may further include an active antenna unit (active antenna unit, AAU). The CU implements some functions of the gNB, and the DU implements some functions of the gNB. For example, the CU is responsible for processing a non-real-time protocol and service, and implementing functions of a radio resource control (radio resource control, RRC) layer and a packet data convergence protocol (packet data convergence protocol, PDCP) layer. The DU is responsible for processing a physical layer protocol and a real-time service, and implementing functions of a radio link control (radio link control, RLC) layer, a media access control (media access control, MAC) layer, and a physical layer (physical layer, PHY). The AAU implements some physical layer processing functions, radio frequency processing, and a function related to an active antenna. Information at the RRC layer eventually becomes information at the PHY layer, or is converted from the information at the PHY layer. Therefore, in the architecture, higher layer signaling such as RRC layer signaling may also be considered as being sent by the DU or sent by the DU and the AAU. It may be understood that the access network device may be a device including one or more of a CU node, a DU node, and an AAU node.

Optionally, in embodiments of this application, communication between the access network device and the terminal may be performed by using a licensed spectrum, communication may be alternatively performed by using an unlicensed spectrum, or communication may be performed by using both a licensed spectrum and an unlicensed spectrum. The access network device and the terminal may communicate with each other by using a spectrum below 6 GHz (gigahertz, GHz), or may communicate by using a spectrum above 6 GHz, or may communicate by using a spectrum below 6 GHz and a spectrum above 6 GHz. A spectrum resource used between the access network device and the terminal 101 is not limited in embodiments of this application.

Optionally, the terminal, the access network device, or the positioning device in embodiments of this application may be deployed on a land, including indoor, outdoor, handheld, or vehicle-mounted devices; or may be deployed on a water surface; or may be deployed on an airplane, a balloon and a satellite in the air. An application scenario of the terminal, the access network device, or the positioning device is not limited in embodiments of this application.

Optionally, in embodiments of this application, the terminal, the access network device, or the positioning device includes a hardware layer, an operating system layer that runs above the hardware layer, and an application layer that runs above the operating system layer. The hardware layer includes hardware such as a central processing unit (central processing unit, CPU), a memory management unit (memory management unit, MMU), and a memory (also referred to as a main memory). An operating system may be any one or more computer operating systems that implement service processing through a process (process), for example, a Linux operating system, a Unix operating system, an Android operating system, an iOS operating system, or a Windows operating system. The application layer includes applications such as a browser, an address book, word processing software, and instant messaging software. In addition, a specific structure of an execution body of a method provided in embodiments of this application is not specifically limited in embodiments of this application provided that a program that records code of the method provided in embodiments of this application can be run to perform communication according to the method provided in embodiments of this application. For example, the method provided in embodiments of this application may be performed by the terminal, the access network device, or the positioning device, or a functional module that can invoke and execute the program in the terminal, the access network device, or the positioning device.

In other words, related functions of the terminal, the access network device, or the positioning device in embodiments of this application may be implemented by one device, may be jointly implemented by a plurality of devices, or may be implemented by one or more functional modules in one device. This is not specifically limited in embodiments of this application. It may be understood that the foregoing function may be a network element in a hardware device, a software function running on dedicated hardware, a combination of hardware and software, or a virtualized function instantiated on a platform (for example, a cloud platform).

Figure 1D:
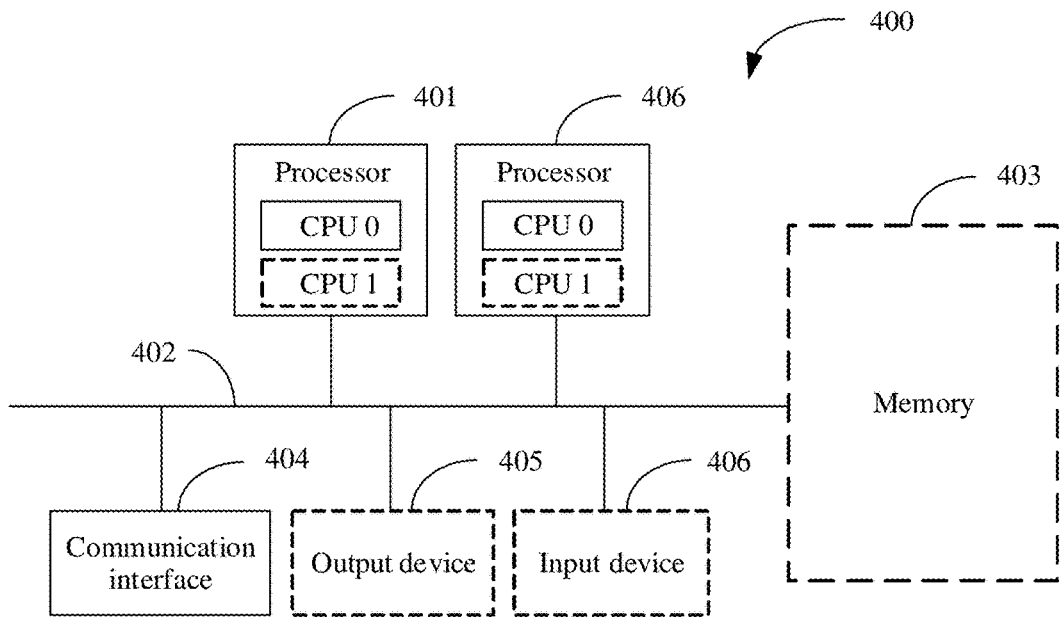
FIG. 1D is a schematic diagram of a structure of a communication apparatus according to an embodiment of this application.

For example, related functions of the terminal, the access network device, or the positioning device in embodiments of this application may be implemented by using a communication apparatus 400 in FIG. 1D. FIG. 1D is a schematic diagram of a structure of the communication apparatus 400 according to an embodiment of this application. The communication apparatus 400 includes one or more processors 401, a communication line 402, and at least one communication interface (a communication interface 404 and one processor 401 are included as an example for description in FIG. 1D). Optionally, the communication apparatus 400 may further include a memory 403.

The processor 401 may be a central processing unit (central processing unit, CPU), a microprocessor, an application-specific integrated circuit (application-specific integrated circuit, ASIC), or one or more integrated circuits configured to control program execution of the solutions in this application.

The communication line 402 may include a channel for connecting different components.

The communication interface 404 may be a transceiver module configured to communicate with another device or a communication network, such as an Ethernet, a RAN, or a wireless local area network (wireless local area network, WLAN). For example, the transceiver module may be an apparatus such as a transceiver machine or a transceiver. Optionally, the communication interface 404 may be alternatively a transceiver circuit located in the processor 401, to implement signal input and signal output of the processor.

The memory 403 may be an apparatus having a storage function. For example, the memory 403 may be a read-only memory (read-only memory, ROM) or another type of static storage device that can store static information and instructions, or a random access memory (random access memory, RAM) or another type of dynamic storage device that can store information and instructions, or may be an electrically erasable programmable read-only memory (electrically erasable programmable read-only memory, EEPROM), a compact disc read-only memory (compact disc read-only memory, CD-ROM) or another optical disk storage, an optical disc storage (including a compact disc, a laser disc, an optical disc, a digital versatile disc, a Blu-ray disc, or the like), a disk storage medium or another magnetic storage device, or any other medium that can be used to carry or store expected program code in a form of instructions or a data structure and that can be accessed by a computer. However, the memory 403 is not limited thereto. The memory may exist independently, and is connected to the processor through the communication line 402. Alternatively, the memory may be integrated with the processor.

The memory 403 is configured to store computer-executable instructions for performing the solutions in this application, and the processor 401 controls execution. The processor 401 is configured to execute the computer-executable instructions stored in the memory 403, to implement a positioning method provided in embodiments of this application.

Alternatively, in this embodiment of this application, the processor 401 may alternatively perform a processing-related function in the positioning method provided in the following embodiment of this application. The communication interface 404 is responsible for communicating with another device or a communication network. This is not specifically limited in this embodiment of this application.

Computer-executable instructions in this embodiment of this application may also be referred to as application program code. This is not specifically limited in this embodiment of this application.

During specific implementation, in an embodiment, the processor 401 may include one or more CPUs such as a CPU 0 and a CPU 1 in FIG. 1D.

In specific implementation, in an embodiment, the communication apparatus 400 may include a plurality of processors, such as the processor 401 and a processor 406 in FIG. 1D. Each of the processors may be a single-core (single-CPU) processor or a multi-core (multi-CPU) processor. Herein, the processor may be one or more devices, circuits, and/or processing cores configured to process data (for example, computer program instructions).

In specific implementation, in an embodiment, the communication apparatus 400 may further include an output device 405 and an input device 406. The output device 405 communicates with the processor 401, and may display information in a plurality of manners.

The communication apparatus 400 may be a general-purpose apparatus or a dedicated apparatus. For example, the communication apparatus 400 may be a desktop computer, a portable computer, a network server, a palmtop computer (personal digital assistant, PDA), a mobile phone, a tablet computer, a wireless terminal, an embedded device, or a device having a structure similar to that shown in FIG. 1D. A type of the communication apparatus 400 is not limited in this embodiment of this application.

The following specifically describes the terminal positioning method provided in embodiments of this application with reference to FIG. 1A to FIG. 1D.

Figure 2A:
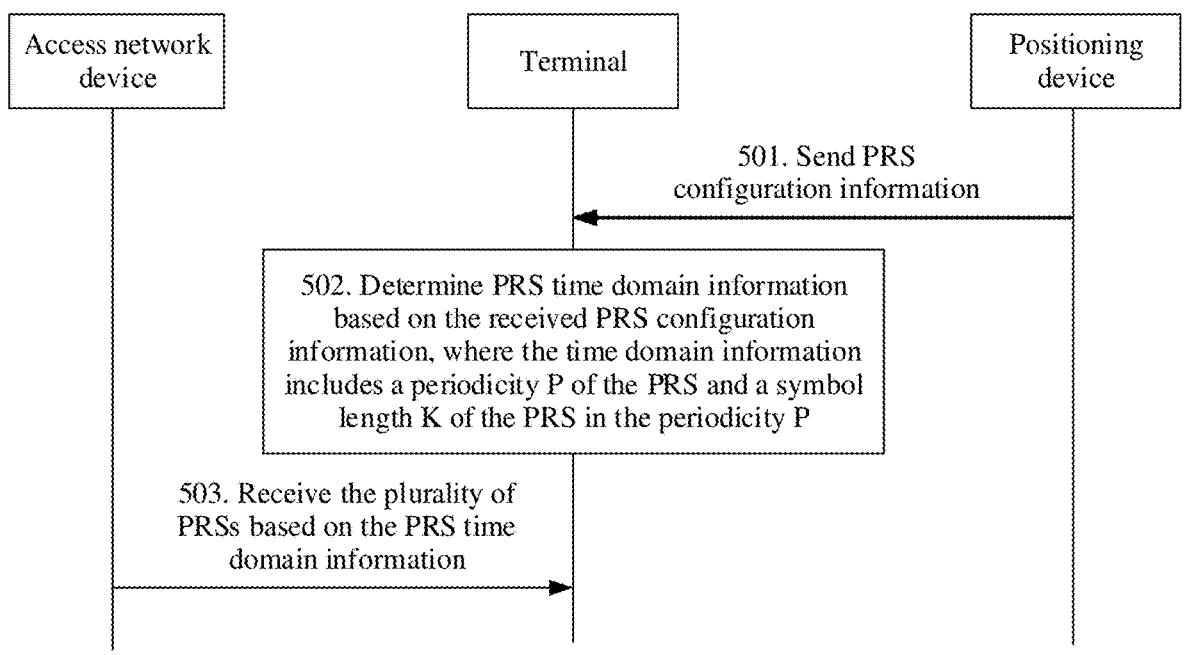
FIG. 2A is a flowchart of a positioning signal processing method according to an embodiment of this application.

FIG. 2A is a flowchart of a positioning signal processing method according to an embodiment of this application. As shown in FIG. 2A, the method includes the following steps:

501. A positioning device or a serving cell and/or a neighboring cell sends PRS configuration information to a terminal, where PRSs are sent by the serving cell and/or the neighboring cell of the terminal device in a form of a PRS resource set, each PRS resource set includes a plurality of PRSs, and one access network device corresponds to one or more PRS resource sets.

502. The terminal determines PRS time domain information based on the received PRS configuration information, where the time domain information includes a periodicity P of the PRS and a symbol length K of the PRS in the periodicity P.

503. The terminal receives the plurality of PRSs based on the PRS time domain information.

Figure 2B:
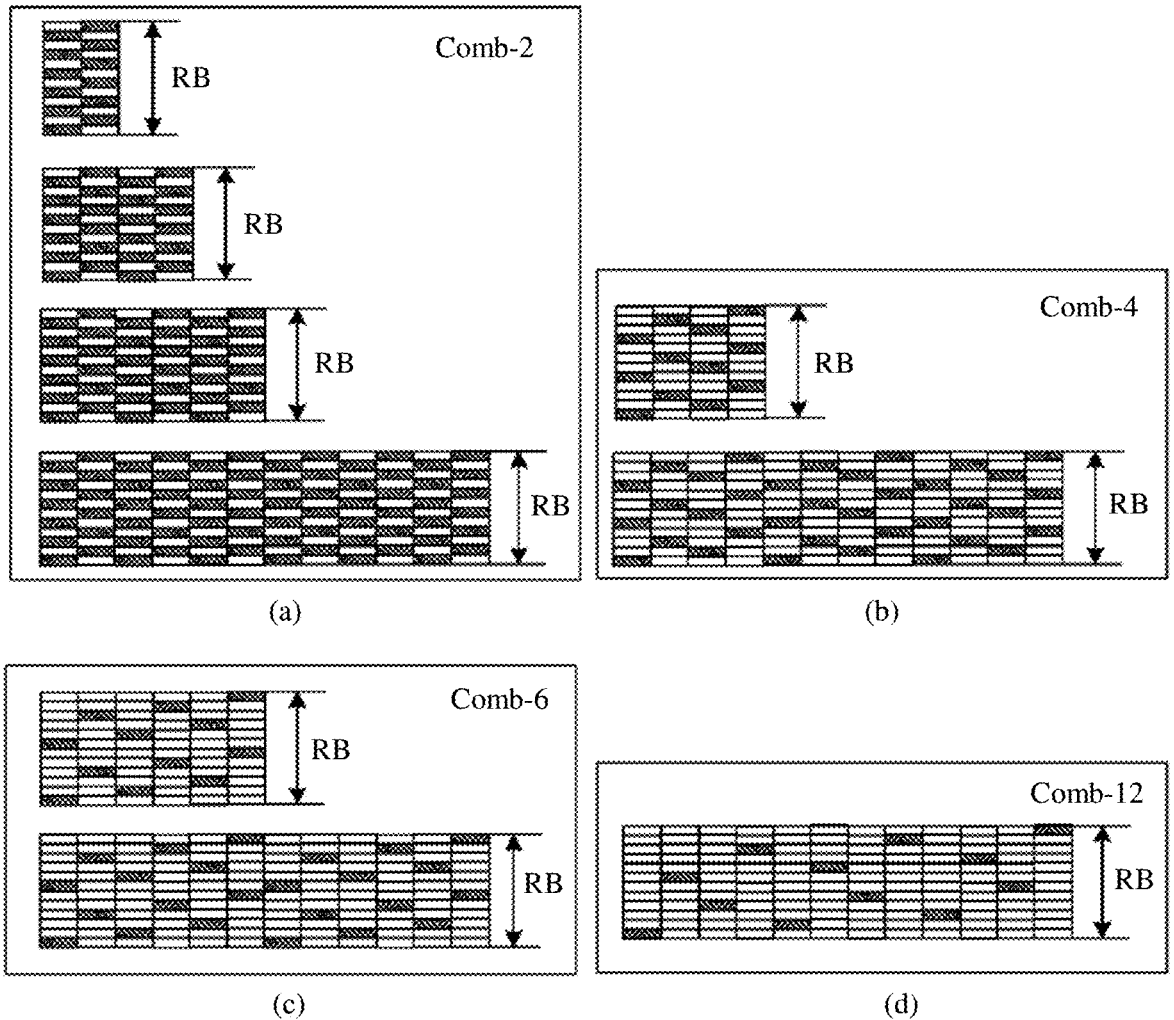
FIG. 2B is a schematic diagram of a mapping pattern supported for a downlink PRS according to an embodiment of this application.

Specifically, the PRS is transmitted in a form of a system frame, a subframe, and a slot. Each system frame has a length of 10 milliseconds (millisecond, ms), including 10 subframes. A length of each subframe is 1 ms, depending on numerology corresponding to an OFDM symbol, including 1, 2, 4, 8, and 16 slots. Lengths of slots depend on the numerology corresponding to the OFDM symbol, and are 1 ms, 0.5 ms, 0.25 ms, 0.125 ms, and 0.0625 ms in sequence. One slot includes orthogonal frequency division multiplexing (Orthogonal Frequency Division Multiplexing, OFDM) symbols. The OFDM symbols correspond to different index values in numerology (Numerology), indicating that the OFDM symbols correspond to different subcarrier spacings in frequency domain. A length of the OFDM symbol is a reciprocal of a value of the subcarrier spacing, and a quantity of OFDM symbols corresponding to the slot length does not change with the subcarrier spacing. Therefore, different subcarrier spacings correspond to different slot lengths in time domain. In one slot, when a corresponding cyclic prefix (Cyclic Prefix, CP) is a normal cyclic prefix (Normal Cyclic Prefix, NCP), 14 OFDM symbols may be included, and when a corresponding CP is an extended cyclic prefix (Extended Cyclic Prefix, ECP), 12 OFDM symbols may be included. FIG. 2B is a schematic diagram of a mapping pattern supported for a downlink PRS according to an embodiment of this application. As shown in FIG. 2B, in a mapping pattern, a horizontal axis represents a time-domain OFDM symbol, and a vertical axis represents a frequency-domain subcarrier. One resource block (Resource block, RB) corresponds to 12 subcarriers. When there are a plurality of RBs, a pilot pattern is repeated in frequency domain. As shown in (a) in FIG. 2B, the PRS is mapped at a spacing of two subcarriers on one OFDM symbol, and is mapped to two different OFDM symbols, where the two OFDM symbols may be repeated in other OFDM symbols in one slot. As shown in (b) in FIG. 2B, the PRS is mapped at a spacing of four subcarriers on one OFDM symbol, and is mapped to two different OFDM symbols, where the four OFDM symbols may be repeated in other OFDM symbol in one slot. As shown in (c) in FIG. 2B, the PRS is mapped at a spacing of six subcarriers on one OFDM symbol, and is mapped to six different OFDM symbols, where the six OFDM symbols may be repeated in other OFDM symbol in one slot. As shown in (d) in FIG. 2B, the PRS is mapped at a spacing of 12 subcarriers on one OFDM symbol, and is mapped to 12 different OFDM symbols. Different TRPs may alternatively send PRSs by offsetting an integer quantity of subcarriers in frequency domain, to implement frequency division multiplexing for the PRSs of different TRPs, and reduce interference. In addition, one PRS resource may be configured with repetition of a plurality of consecutive or non-consecutive slots, and one TRP may also have a plurality of PRS resources for transmit beam sweeping.

The PRS configuration information sent by the positioning device to the terminal may be sent to a specific terminal, or may be broadcast to a plurality of terminals by using serving cell system information. The PRS configuration information is used to indicate a corresponding parameter of the PRS delivered by the access network device, including a delivered serving cell or neighboring cell of the PRS, a time-frequency resource for sending the PRS, and the like. The PRS is sent in a form of a PRS resource set, indicating that each TRP delivers PRSs in a form of a resource set and may deliver one or more PRS resource sets, where each PRS resource set includes a plurality of PRSs.

After receiving the PRS configuration information, the terminal determines time domain information of the PRSs, including the periodicity P and the symbol length K of the PRSs in one periodicity P. Herein, because the PRS configuration information may be for a plurality of serving cells, and each serving cell may be corresponding to a plurality of frequencies, the configuration information may include PRS configurations from a plurality of positioning frequencies and/or PRS configurations from a plurality of access network devices. That the access network device is a TRP is used as an example. For each TRP, each of at most two PRS resource sets on one frequency may include at most 64 PRS resources. The PRS resource sets have corresponding sending periodicities, which may be different. Therefore, when the PRS time domain information corresponding to the PRS configuration information is obtained, a common periodicity P and a symbol length K of the PRS in the periodicity P need to be obtained. This indicates that a symbol length of the PRS that needs to be received by the terminal within each duration P is K.

Generally, the terminal receives the PRS per frequency. Therefore, when receiving the configuration information corresponding to a plurality of positioning frequencies, the terminal performs frequency-based classification to determine a PRS resource set sent by one or more TRPs corresponding to each frequency and PRSs included in the resource set.

The method for determining the periodicity P of the PRS includes the following steps:

(1) A common sending periodicity of a plurality of PRS resource sets corresponding to a plurality of TRPs is used as P. In some cases, sending periodicities configured for the plurality of PRS resource sets corresponding to the plurality of TRPs are the same. In this case, the common periodicity may be directly used as the periodicity P corresponding to the PRS time domain information.

(2) A common sending periodicity of first PRS resource sets corresponding to each TRP in the plurality of TRPs is used as P. Each of the plurality of TRPs sends at least one PRS resource set. If the resource sets satisfy the following condition: $T(x1, y1)=T(x2, y2)=T(x3, y3)=P$, where $T(x, y)$ represents a periodicity of a $y^{th}$ PRS resource set corresponding to an $x^{th}$ TRP, the first PRS resource set represents any one resource set in each TRP. The equation indicates that in the PRS resource sets sent by each TRP, at least one PRS resource set has the same periodicity as a PRS resource set corresponding to another TRP and the periodicity is P. Then, P is used as the periodicity corresponding to the PRS time domain information.

Optionally, the first PRS resource set may be the $1^{st}$ PRS resource set on a PRS resource set list included in each TRP, or a PRS resource set with a smallest resource set index value on the resource set list. The resource set index values may be established for each TRP, or may be established by an LMF for all received PRS resource sets. For example, a TRP 1 includes two PRS resource sets, and corresponding index values established by the LMF are respectively 3 and 5. In this case, the first PRS resource set corresponding to the TRP 1 is a PRS resource set corresponding to the index value 3.

(3) A sending periodicity of a first PRS resource set corresponding to a first TRP in the plurality of TRPs is used as P. The sending periodicity of the first PRS resource set corresponding to the first TRP is a common divisor of sending periodicities of the first PRS resource sets corresponding to each TRP in the plurality of TRPs.

The first PRS resource set of the first TRP may be any PRS resource set of any TRP in the plurality of TRPs. A sending periodicity corresponding to the PRS resource set is a common divisor of sending periodicities of at least one PRS resource set of another TRP.

Specifically, information is shown in Table 1.

TABLE 1

| Transmission reception point | TRP 1 | TPR 2 | TRP 3 |
| --- | --- | --- | --- |
| Periodicity T (unit: ms) | PRS 1-1: 10<br>PRS 1-2: 20 | PRS 2-1: 15<br>PRS 2-2: 30 | PRS 3-1: 30<br>PRS 3-2: 15 |

It can be learned from Table 1 that a periodicity of the $1^{st}$ PRS resource set of the TPR 1 is 10 ms, and the value is a common divisor of PRS 1-1, PRS 2-2, and PRS 3-1. Therefore, the periodicity of 10 ms may be used as the periodicity P of the time domain information.

Alternatively, the first PRS resource set is the $1^{st}$ PRS resource set on the PRS resource set list included in the TRP, or a PRS resource set with a smallest resource set index value on the PRS resource set list included in the TRP. Therefore, in Table 1, a periodicity T that is the common divisor of PRS 1-1, PRS 2-1, and PRS 3-1 needs to be obtained as the periodicity P of time domain information.

(4) A greatest common divisor of the sending periodicities of the first PRS resource sets corresponding to each TRP in the plurality of TRPs is used as P.

In some cases, the periodicities T corresponding to the PRS resource sets of the TRPs each may not be used as a common divisor. In this case, a greatest common divisor of the sending periodicities of the first PRS resource sets of each TRP may be obtained and used as P.

The first PRS resource set may be any PRS resource set corresponding to each TRP. When possible, different resource sets of the TRPs are selected as first resource sets, and corresponding greatest common divisors are different. For example, for PRS 1-1, PRS 2-1, and PRS 3-1 in Table 1, a corresponding greatest common divisor is 5 ms. For PRS 1-1, PRS 2-2, and PRS 3-1, a corresponding greatest common divisor is 10 ms. A greatest common divisor with a larger value may be selected as P, that is, P=10 ms.

Alternatively, the first PRS resource set may be the $1^{st}$ PRS resource set on the PRS resource set list included in the TRP, or a PRS resource set with a smallest resource set index value on the PRS resource set list included in the TRP. Correspondingly, in Table 1, first PRS resource sets corresponding to the three TRPs are respectively PRS 1-1, PRS 2-1, and PRS 3-1. A greatest common divisor corresponding to the three TRPs is 5 ms, and therefore, P=5 ms.

(5) A greatest common divisor of sending periodicities of a plurality of PRS resource sets corresponding to each TRP in the plurality of TRPs is used as P.

In some cases, a greatest common divisor may be obtained from all PRS resource sets corresponding to the PRS configuration information sent by the LMF to the UE, and then the greatest common divisor is used as the periodicity P in the time domain information.

The data in Table 1 is used as an example. A greatest common divisor of sending periodicities of the plurality of PRS resource sets corresponding to the three TRPs is 5 ms. Therefore, the periodicity P in the time domain information is 5 ms.

(6) A least common multiple of the sending periodicities of the first PRS resource sets corresponding to each TRP in the plurality of TRPs is used as P.

In some cases, the least common multiple of the sending periodicities of the first PRS resource sets of each TRP in the plurality of TRPs may be used as P. The first PRS resource set may be any PRS resource set corresponding to each TRP. Corresponding to Table 1, a corresponding least common multiple of the sending periodicities of PRS 1-1, PRS 2-2 and PRS 3-1 is a periodicity T of PRS 3-1, or a corresponding least common multiple of the sending periodicities of PRS 1-1, PRS 2-1 and PRS 3-2 is a periodicity T of PRS 3-2, and these already-existing periodicities T are used as P. If different PRS resource sets are selected as the first PRS resource sets in each TRP, and different least common multiples are obtained, a least common multiple with a smaller value may be selected as P.

If the first PRS resource set is the $1^{st}$ PRS resource set on the PRS resource set list included in the TRP, or a PRS resource set with a smallest resource set index value on the PRS resource set list included in the TRP, corresponding to Table 1, a corresponding least common multiple of the sending periodicities of PRS 1-1, PRS 2-1, and PRS 3-1 needs to be obtained, where P is the periodicity T of PRS 3-1.

(7) A least common multiple of the sending periodicities of the plurality of PRS resource sets corresponding to each TRP in the plurality of TRPs is used as P.

In some cases, a least common multiple may be obtained from all the PRS resource sets corresponding to the PRS configuration information sent by the LMF to the UE, and then the least common multiple is used as the periodicity P in the time domain information.

Using the data in Table 1 as an example, a least common multiple of the sending periodicities of the plurality of PRS resource sets corresponding to the three TRPs is 60 ms. Therefore, the periodicity P in the time domain information is 60 ms.

In this embodiment of this application, the periodicity P of the PRS in a PRS configuration received by the terminal is determined by comprehensively referring to periodicities of the plurality of PRS resource sets corresponding to the plurality of TRPs. Therefore, a PRS resource set of each TRP is comprehensively considered for the determined periodicity, ensuring reliability of the determined periodicity P.

After the periodicity P is determined, the symbol length K of the PRS in the periodicity P needs to be determined. Before K is determined, a first slot set needs to be determined, where the first slot set includes all PRSs that are sent within the duration P and that are configured by the LMF. The LMF configures a plurality of PRS resource sets for a plurality of TRPs, and each PRS resource set includes a plurality of PRSs. The plurality of PRSs may be configured at intervals or may be configured in a multiplexing mode in time domain Therefore, slots corresponding to all the PRSs in P may be consecutive slots, or may be slots existing at intervals.

Figure 2C:
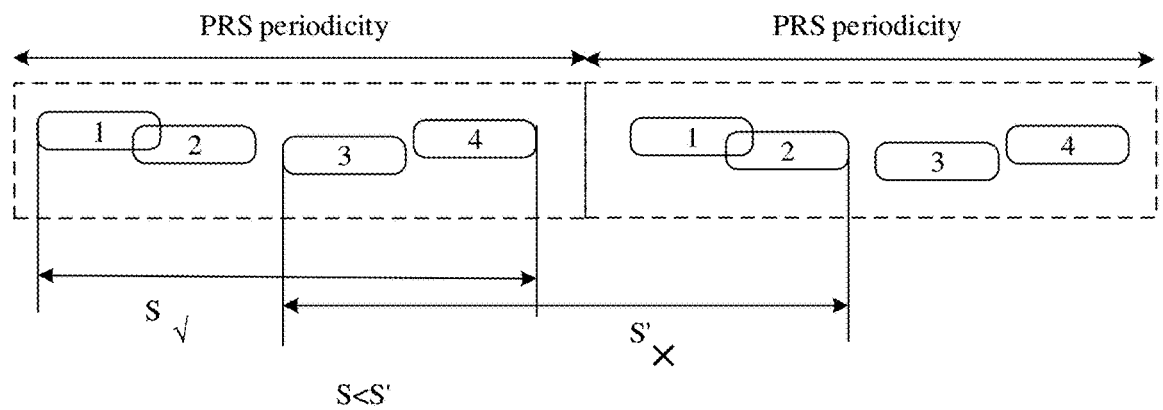
FIG. 2C is a schematic diagram of PRS distribution according to an embodiment of this application.

Optionally, if slots corresponding to the PRSs in P are consecutive slots, a minimum consecutive slot set, namely, a set formed in a PRS arrangement manner that occupies a smallest slot length, may be obtained and used as the first slot set in P. FIG. 2C is a schematic diagram of PRS distribution according to an embodiment of this application. As shown in FIG. 2C, four different PRSs are included and may be sent by a same TRP or by a plurality of different TRPs, and repeatedly appear in a periodicity P. A start location of the periodicity may start from PRS 1, PRS 3, or any other location. In the figure, two consecutive slot sets S and S' are given, and both may include all PRSs sent by the TRP. However, a slot length occupied by S is smaller than that occupied by S'. In this case, it may be determined that a consecutive slot set in the periodicity P is S.

Figure 2D:
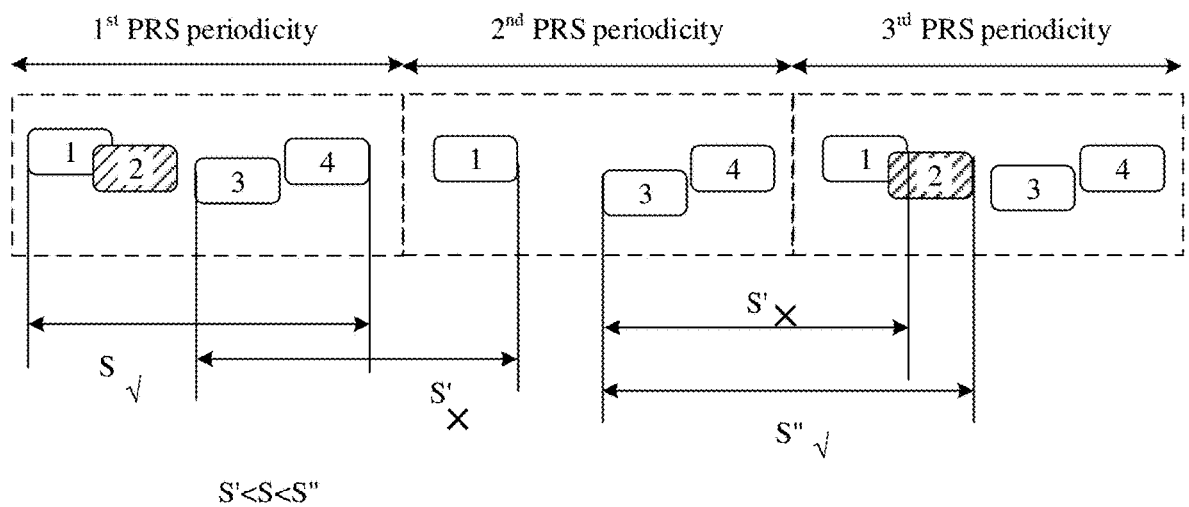
FIG. 2D is another schematic diagram of PRS distribution according to an embodiment of this application.

It is assumed that different PRS resource sets on one frequency have different periodicities, for example, the six PRS resource sets shown in Table 1 correspond to different periodicities T, and the periodicity P determined based on the plurality of periodicities T is smaller than a periodicity T (for example, when P is determined based on a greatest common divisor of the plurality of Ts). In this case, some Ps include a PRS resource set sent by a TRP whereas other periodicities do not include the resource set. In this case, the selected consecutive slot set is a set including all PRS resources sent by the TRP in all PRS periodicities, and a set formed in a PRS arrangement manner that occupies a smallest slot length is used as the first slot set in P. FIG. 2D is another schematic diagram of PRS distribution according to an embodiment of this application. As shown in FIG. 2D, the $1^{st}$ PRS periodicity and the $3^{rd}$ PRS periodicity each include four PRSs, which are respectively PRS 1 to PRS 4; and the $2^{nd}$ PRS periodicity includes three PRSs: PRS 1, PRS 3, and PRS 4. In other words, a periodicity of PRS 2 is 2P. Both a slot set S and a slot set S" include PRS resource sets sent by all TRPs in the periodicity P, and the slot set S' does not include PRS 2. Therefore, the first slot set is selected from S and S. In addition, because S<S", the determined first slot set (a minimum consecutive slot set) is S in this case.

Figure 2E:
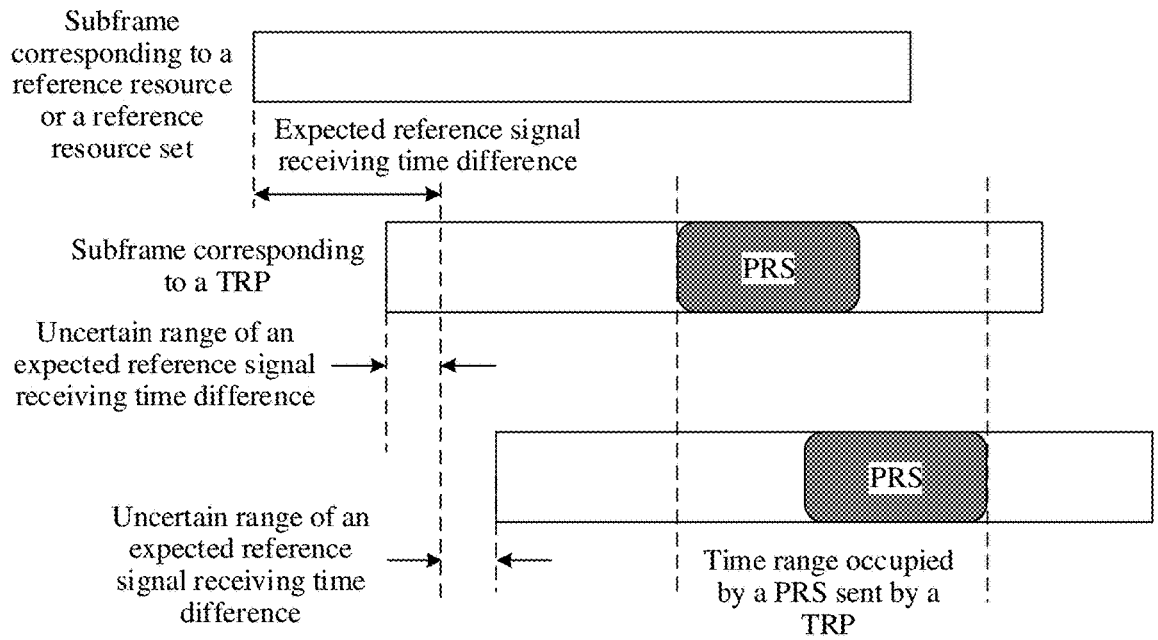
FIG. 2E is a schematic diagram of determining a time range occupied by a PRS according to an embodiment of this application.

The first slot set includes a plurality of slots, and the PRS in each slot occupies a specific time length. The time length occupied by the PRS in each slot may be determined, and then the corresponding symbol length K is determined based on the time length. The time length occupied by each PRS in the slot may not be a definite value, but a possible time range. FIG. 2E is a schematic diagram of determining a time range occupied by a PRS according to an embodiment of this application. As shown in FIG. 2E, a time range occupied by a PRS resource sent by each TRP may be: a search window for a subframe boundary is determined based on an expected reference signal time difference (Expected RSTD) and an expected reference signal time difference uncertainty (Expected RSTD uncertainty) of TRP timing with respect to timing of a reference resource or reference resource set (for example, the reference resource or reference resource set may be configured through an nr-DL-PRS-ReferenceInfo-r16 information element). Then, the time range that needs to be occupied for receiving the PRS resource is determined based on a slot index in a subframe occupied by the PRS, a symbol index in the slot, and a quantity of symbols.

Figure 2F:
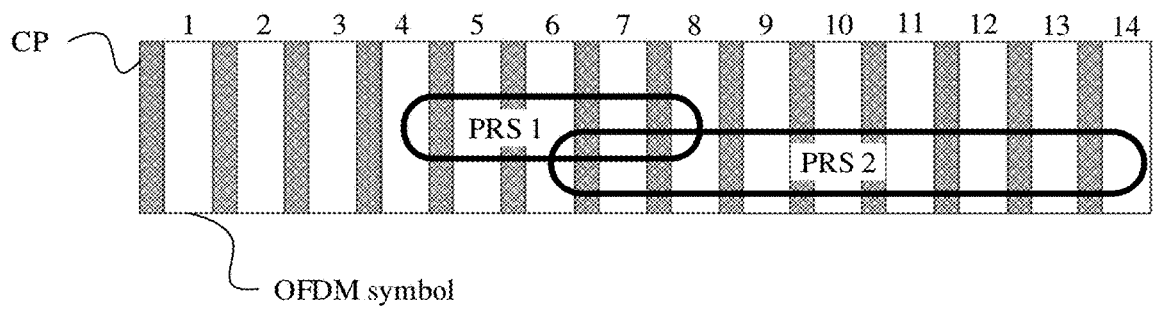
FIG. 2F is a schematic diagram of occupying symbols in a slot by PRSs according to an embodiment of this application.

Optionally, a symbol length occupied by PRSs in each slot in S is a union set of symbol lengths occupied by PRS resources sent by all TRPs in the slot. FIG. 2F is a schematic diagram of occupying symbols in a slot by PRSs according to an embodiment of this application. As shown in FIG. 2F, symbols occupied by PRS 1 are [4, 8], indicating that occupation starts from the fourth symbol to the eighth symbol; and symbols occupied by PRS 2 are [6, 14]. A union set of PRS 1 and PRS 2 is [4, 14], and therefore a total length of symbols occupied by PRS 1 and PRS 2 is [4, 14].

After the first slot set and the time range in which PRS symbols may appear in the first slot set are determined, a first symbol length of the PRS in each slot may be first obtained, and then the symbol length K of the PRS in the slot set is determined based on the first symbol length.

Figure 2G:
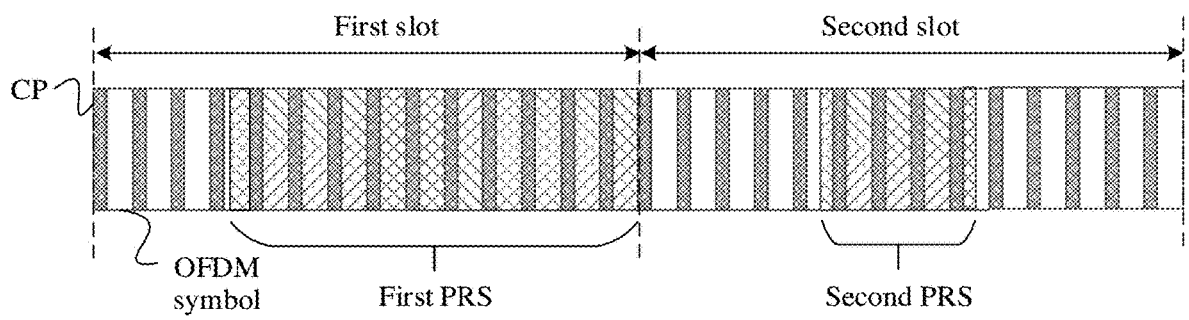
FIG. 2G is a schematic diagram of PRS distribution in each slot according to an embodiment of this application.

Specifically, FIG. 2G is a schematic diagram of PRS distribution in each slot according to an embodiment of this application. As shown in FIG. 2G, an example in which each slot includes 14 OFDM symbols is used. Each OFDM symbol further includes a cyclic prefix (Cyclic Prefix, CP). A first PRS is transmitted in a first slot, and a second PRS is transmitted in a second slot. After a start moment and an end moment of each of the first PRS and the second PRS are obtained, first symbol lengths of the first PRS and the second PRS may be correspondingly determined.

Optionally, the determining the first symbol length of the PRS based on the start moment and the end moment includes: determining the first symbol length of the PRS in each slot based on an OFDM symbol determined at a PRS subcarrier spacing corresponding to the start moment and an OFDM symbol determined at a PRS subcarrier spacing corresponding to the end moment. For example, as shown in FIG. 2E, an OFDM symbol in which a start moment of the first PRS is located is the fourth OFDM symbol in the first slot, and an OFDM symbol in which an end moment is located is the fourteenth OFDM symbol in the first slot. In this case, the first symbol length may be a length corresponding to the fourth to the tenth OFDM symbols. A method for calculating the first symbol length of the PRS in an $s^{th}$ slot satisfies the following formula:

$$K_s = \frac{1}{2^\mu N_{symb}^{slot}} \left( \text{ceil}\left(2^\mu N_{symb}^{slot} T_s^{end}\right) - \text{floor}\left(2^\mu N_{symb}^{slot} T_s^{start}\right) \right) \quad (1)$$

where $K_s$ represents a first symbol length of a PRS in an $s^{th}$ slot in the first slot set; $\mu$ in $2^\mu N_{symb}^{slot}$ represents an index value of numerology (Numerology) corresponding to a slot for transmitting the PRS, where different values of $\mu$ correspond to different subcarrier spacings, for example, $\mu=0$, 1, 2, and 3 respectively correspond to subcarrier spacings of 15 kHz, 30 kHz, 60 kHz, and 120 kHz; $N_{symb}^{slot}$ represents a quantity of OFDM symbols included in one slot, $$\frac{1}{2^\mu N_{symb}^{slot}}$$

represents slot duration corresponding to a subcarrier spacing of $\mu$, $T_s^{end}$ represents an end moment of the $s^{th}$ slot, $T_s^{start}$ represents a start moment of the $s^{th}$ slot, ceil( ) is a ceiling function, and floor( ) is a floor function.

Optionally, the determining the first symbol length of the PRS based on the start moment and the end moment includes: obtaining a time interval between the start moment and the end moment; and determining the first symbol length of the PRS in each slot based on a symbol length corresponding to an OFDM symbol determined at a PRS subcarrier spacing corresponding to the time interval. For example, as shown in FIG. 2E, a difference between a start moment and an end moment of the second PRS is calculated to obtain a time interval between the start moment and the end moment, and then a symbol length corresponding to an OFDM symbol determined at a PRS subcarrier spacing corresponding to the time interval is determined. The start moment and the end moment each span 0.5 OFDM symbol, and therefore a time interval corresponding to the start moment and the end moment includes a total of 0.5+3+0.5=4 OFDM symbols. A symbol length corresponding to the four OFDM symbols is the first symbol length of the PRS in the slot. A method for calculating the first symbol length of the PRS in the $s^{th}$ slot satisfies the following formula:

$$K_s = \frac{1}{2^\mu N_{symb}^{slot}} \text{ceil}\left(2^\mu N_{symb}^{slot} \left(T_s^{end} - T_s^{start}\right)\right) \quad (2)$$

Elements in formula (2) have the same meanings as those in formula (1).

After the first symbol length of the PRS in each slot in the first slot set is obtained through calculation, summation may be performed on the first symbol lengths of the slots to obtain the symbol length K of the PRS in the first slot set. The calculation method satisfies the following formula:

$$K = \Sigma_{s \in S} K_s \quad (3)$$

S represents a quantity of slots included in the first slot set, and $K_s$ represents a slot with an index value of s in S or a first symbol length corresponding to the $s^{th}$ slot. Alternatively, $K_s$ may be obtained through calculation according to the corresponding method in formula (1) or formula (2).

Optionally, a maximum value of first symbol lengths of PRSs in a plurality of slots in the first slot set may be used as a second symbol length of the PRS in each slot in the first slot set. Then, summation is performed on S second symbol lengths in the first slot set, to obtain a symbol length of the PRS in the first slot set. A corresponding calculation method satisfies the following formula:

$$K = K_m |S|, \quad (4)$$

$$\text{where } K_m = \max_s \frac{1}{2^\mu N_{symb}^{slot}} \left( \text{ceil}\left(2^\mu N_{symb}^{slot} T_s^{end}\right) - \text{floor}\left(2^\mu N_{symb}^{slot} T_s^{start}\right) \right)$$

In the foregoing formula, a method corresponding to formula (1) is used to calculate the first symbol length of the PRS in each slot in the first slot set, and max( ) is a function for taking a maximum value. A maximum value in the first symbol lengths is used as the second symbol length of the PRS in each slot, and is multiplied by the quantity S of slots in the first slot set, to obtain the symbol length of the PRS in the first slot set.

Alternatively, during obtaining of the symbol length of the PRS in the first slot set according to the calculation method, the corresponding method in formula (2) may also be used to calculate the first symbol length of the PRS in each slot in the first slot set, and then summation is performed on maximum values of the symbol lengths, to obtain the symbol length of the PRS in the first slot set. A corresponding calculation method satisfies the following formula:

$$K = K_m |S|, \text{ where } K_m = \max_s \frac{1}{2^\mu N_{symb}^{slot}} \text{ceil}\left(2^\mu N_{symb}^{slot}\left(T_s^{end} - T_s^{start}\right)\right) \quad (5)$$

Optionally, summation may be directly performed on slot lengths corresponding to the slots used to transmit the PRS in the first slot set, to obtain the symbol length of the PRS in the first slot set. A corresponding calculation method satisfies the following formula:

$$K = \frac{|S|}{2^\mu} \quad (6)$$

where |S| represents the quantity of slots in the first slot set, and μ represents the index value of numerology corresponding to the slot for transmitting the PRS.

It can be learned that, in this embodiment of this application, the first slot set including slots in the periodicity P is obtained, and then the first symbol length for transmitting the PRS in the slot is determined based on a start moment and an end moment of transmitting the PRS in a single slot in the first slot set. Then, the symbol length of the PRS in the first slot set is obtained based on the first symbol length, and the symbol length K of the PRS corresponding to the periodicity P is calculated in the process, thereby ensuring comprehensiveness and integrity of an obtained result.

In the foregoing description, the S slots in the first slot set are consecutive slots, where some slots in these consecutive slots are used to transmit a PRS, and some other slots may not be used to transmit a PRS but are used to transmit another signal.

Figure 2H:
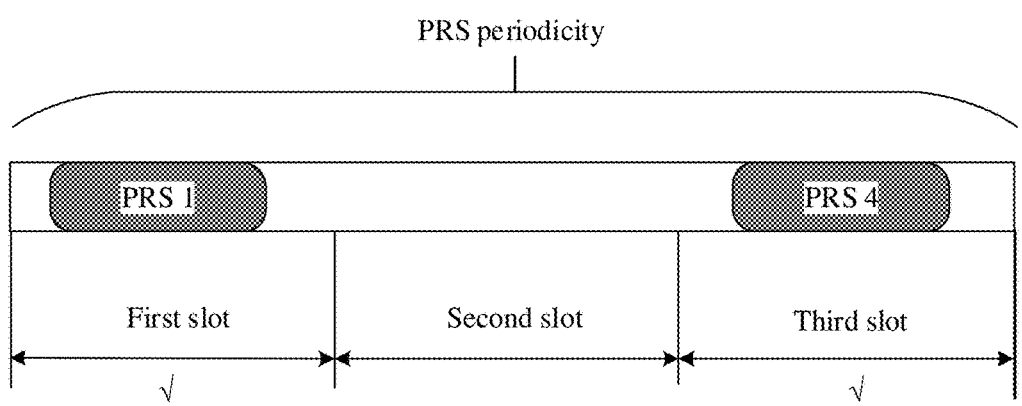
FIG. 2H is a schematic diagram of a first slot set including non-consecutive slots according to an embodiment of this application.

In some cases, the S slots in the first slot set may be alternatively non-consecutive slots and include slots all used to transmit a PRS. FIG. 2H is a schematic diagram of a first slot set including non-consecutive slots according to an embodiment of this application. As shown in FIG. 2H, a consecutive slot set corresponding to the periodicity P includes three consecutive slots. A first slot and a third slot are used to transmit PRSs sent by at least one TRP, whereas a second slot is not used to transmit a PRS. In this case, the first slot set includes the first slot and the third slot, but does not include the second slot.

Figure 2I:
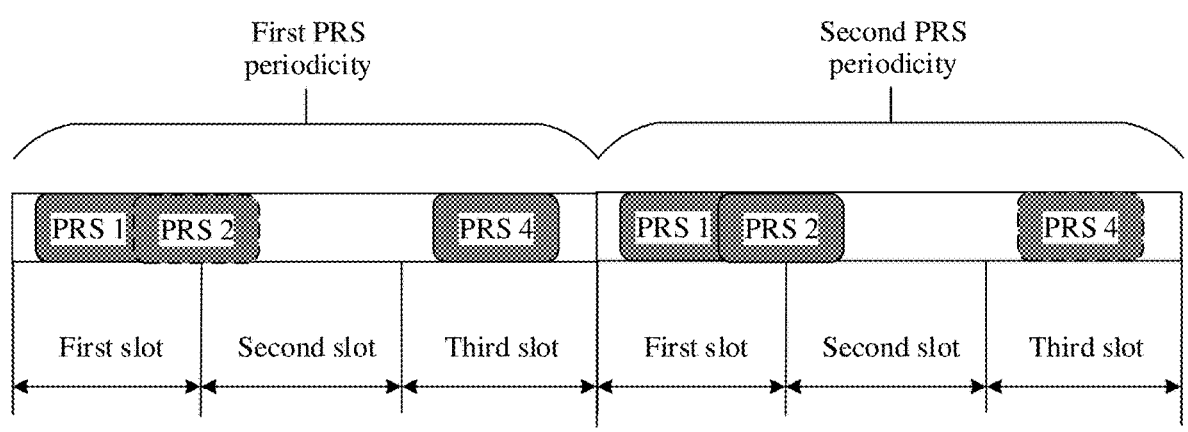
FIG. 2I is a schematic diagram of determining a first slot set based on a union set of a plurality of periodicities according to an embodiment of this application.

In some cases, different PRS resource sets on a frequency have different sending periodicities. As a result, in determined periodicities P of the PRS, some periodicities include a PRS resource set sent by a TRP, whereas other periodicities do not include the resource set. In this case, the first slot set may be a union set of slot sets selected in all the periodicities P. FIG. 2I is a schematic diagram of determining a first slot set based on a union set of a plurality of periodicities according to an embodiment of this application. As shown in FIG. 2I, a first PRS periodicity is used to transmit a PRS 1 and a PRS 4, and a second PRS periodicity is used to transmit the PRS 1 and a PRS 2. A union set of the two periodicities includes the PRS 1, the PRS 2, and the PRS 4, and the union set is transmitted in a first slot, a second slot, and a third slot. In this case, the first slot set corresponding to the periodicity P includes the first slot, the second slot, and the third slot, and corresponding PRSs include the PRS 1, the PRS 2, and the PRS 4. The symbol length K corresponding to the periodicity P may be obtained by calculating symbol lengths of the PRSs.

Similarly, when the slots included in the first slot set are all slots (which may be non-consecutive slots) used to transmit the PRS, the symbol length K corresponding to the periodicity P may be alternatively obtained through calculation by using one or a combination of formula (1) to formula (6).

It can be learned that, in this embodiment of this application, the first slot set including slots, in the periodicity P, that are used to transmit the PRS is obtained, and then the first symbol length for transmitting the PRS in the slot is determined based on a start moment and an end moment of transmitting the PRS in a single slot in the first slot set. Then, the symbol length of the PRS in the first slot set is obtained based on the first symbol length, and the symbol length K of the PRS corresponding to the periodicity P is calculated in the process, thereby ensuring accuracy of an obtained result.

After obtaining the PRS time domain information through calculation, the terminal needs to receive the PRS configured by the LMF. The time domain information may be compared with processing capability information of the terminal, to determine, based on a comparison result, a method for processing PRS resources by the terminal.

The processing capability information of the terminal includes a processing periodicity T and a symbol length N that can be processed within the processing periodicity T. In other words, the terminal can process a PRS symbol with the length N within the time T, where units of T and N may be milliseconds. The PRS symbol length is duration of a corresponding OFDM symbol when the PRS is transmitted in time domain. The same terminal may report a plurality of combinations of processing capability information, and (P, K) in the obtained PRS time domain information may be compared with (T, N) in the processing capability information of the terminal, to determine that the terminal can receive the PRS within a range of at least one combination of capabilities. When sending the PRS configuration information to the terminal, or broadcasting the PRS configuration information to the terminal through the serving cell system information, the LMF may not send the configuration information to the terminal based on a terminal reported capability, or may send the configuration information to a plurality of terminals at the same time without considering reported capabilities of all terminals. Therefore, when receiving the PRS configuration information, the terminal obtains the time domain information corresponding to the PRS, and compares the time domain information with a capability reported by the terminal, to determine whether the terminal supports the configuration, how the terminal supports the configuration, and the like.

Because processing duration and a processed data volume of the terminal do not always change linearly, the plurality of combinations of processing capability information reported by the terminal do not necessarily have an exponential scaling relationship. For example, the plurality of combinations of processing capability information (N, T) reported by the terminal may be (1, 5), (3,80), (5,160), (8,320), (10, 640), (12, 1280), respectively, where units of N and T may be milliseconds (ms), or N and T may be other time measurement units, such as a quantity of slots and a quantity of symbols.

It is assumed that (K, P)=(5, 200), which represents a PRS configured by the LMF for the terminal, requiring the terminal to complete processing of a PRS signal with duration of 5 ms within 200 ms. When a combination of processing capability information (N, T)=(5, 160) exists in the plurality of combinations of processing capability information, it indicates that 160 ms is required for the terminal to process a 5-ms PRS signal, satisfying T≤P, and N≥K. In other words, the PRS configured by the LMF falls within a range of processing capabilities of the terminal, so that the terminal can receive the PRS from a corresponding access network device based on the time domain information (K, P).

It is assumed that (K, P)=(4, 100), which represents a PRS configured by the LMF for the terminal, requiring the terminal to complete processing of a PRS signal with duration of 4 ms within 100 ms. When T≤P and N≥K are not satisfied in the plurality of combinations of processing capability information, a combination of (N, T) is determined and satisfies N≥K, for example, (N, T)=(5, 160). Then, the terminal may receive, based on the time domain information (N, T), the PRS configured by the LMF, which indicates that the terminal completes reception of the 5-ms PRS within 160 ms. Because the PRS periodicity is 100 ms, the terminal receives only a 4-ms PRS delivered by the access network device within the first 100 ms, receives only 1 ms of a 4-ms PRS delivered in the second 100 ms, with the remaining 3-ms PRS discarded, or does not receive the 4-ms PRS delivered in the second 100 ms at all. In addition, the terminal only needs to complete processing of the 5-ms PRS within 160 ms. Within the second 100 ms, only 60 ms is occupied for PRS processing, and in the remaining 40 ms, the terminal may not perform any operation related to positioning.

It is assumed that (K, P)=(5, 100), which represents a PRS configured by the LMF for the terminal, requiring the terminal to complete processing of a 5-ms PRS signal within 100 ms. When T≤P and N≥K are not satisfied in the plurality of combinations of processing capability information, another possible implementation is to determine a combination of (N, T) satisfying T≤P, for example, (N, T)=(3, 80). Then, the terminal may receive, based on the time domain information (N, P), the PRS configured by the LMF, which indicates that the terminal completes, based on the periodicity P, reception of the PRS with N=3 ms in the PRS sent according to P=100 ms and K=5 ms, and discards the remaining PRS of K—N=5−3=2 ms.

In another implementation, when (N, T) satisfies T≤P, the terminal may process a PRS signal with duration of K by using $$\mathrm{ceil}\left(\frac{K}{N}\right)$$

periodicities. For example, if the terminal needs to receive a PRS with K=5 ms, $$\mathrm{ceil}\left(\frac{5}{3}\right) = 2$$

periodicities P are required, and the PRS is received by using a periodicity T in each periodicity P. In other words, in the first 100 ms periodicity, the terminal processes a PRS of 3 ms by using 80 ms, and in the second 100 ms periodicity, the terminal processes a PRS of 2 ms by using 80 ms.

In addition, because the terminal may process a PRS of 3 ms every 80 ms, the terminal may process an additional 1-ms PRS in addition to a PRS of 2 ms that needs to be processed in the second 100 ms periodicity, which is not limited herein.

Alternatively, optionally, the LMF may broadcast the configuration information of the PRS, and the configuration information is only for some terminals. In this case, the terminals may receive the PRS based on the configuration information from the LMF. For other terminals, if T≤P and N≥K are not satisfied, the terminals do not receive all PRSs delivered by the access network device.

Optionally, for the "≥" or "≤" equation, a combination of values with a minimum difference between two sides of the equation is preferentially selected. For example, the processing capability information (N, T) in the foregoing example may be (1, 5), (3,80), (5,160), (8,320), (10, 640), (12, 1280), respectively. However, when (K, P)=(5, 100), if it is necessary to determine whether one combination of (N, T) satisfies T≤P, (N, T)=(3,80) is preferentially selected and then (N, T)=(1,5) is selected.

Optionally, the method may further include the following steps:

504. The terminal obtains measurement results corresponding to the plurality of PRSs.

505. The positioning device sends a measurement result request to the terminal.

506. The positioning device receives the measurement results that are corresponding to the plurality of PRSs and that are sent by the terminal based on the measurement result request, and requests to perform positioning based on the measurement results.

The terminal determines, according to the above-described method, a manner of receiving the PRS delivered by the access network device, and after receiving the PRS, obtains the measurement result corresponding to the PRS. The positioning device sends the measurement result request to the terminal, to obtain the measurement result corresponding to the PRS, and complete a positioning process. In this process, the positioning device has obtained the PRS configuration information corresponding to the terminal and the processing capability information reported by the terminal. Therefore, the positioning device may also perform the calculation process for the PRS time domain information, and determine, based on the PRS time domain information and the processing capability information of the terminal, a capability of the terminal to support the PRS. Therefore, when requesting to obtain the measurement result sent by the terminal, the positioning device may obtain the measurement result based on a corresponding delay. In addition, the positioning device may learn specific PRSs for which the terminal obtains measurement results, and further determine accuracy and reliability of the measurement results.

It can be learned that in this embodiment of this application, the terminal compares the obtained PRS time domain information configured by the positioning device with the processing capability information reported by the terminal, to determine a manner in which the terminal receives the PRS delivered by the access network device, so that the terminal supports, based on an actual capability, a PRS resource configured by the positioning device. This improves efficiency of receiving the PRS by the terminal.

Figure 3A:
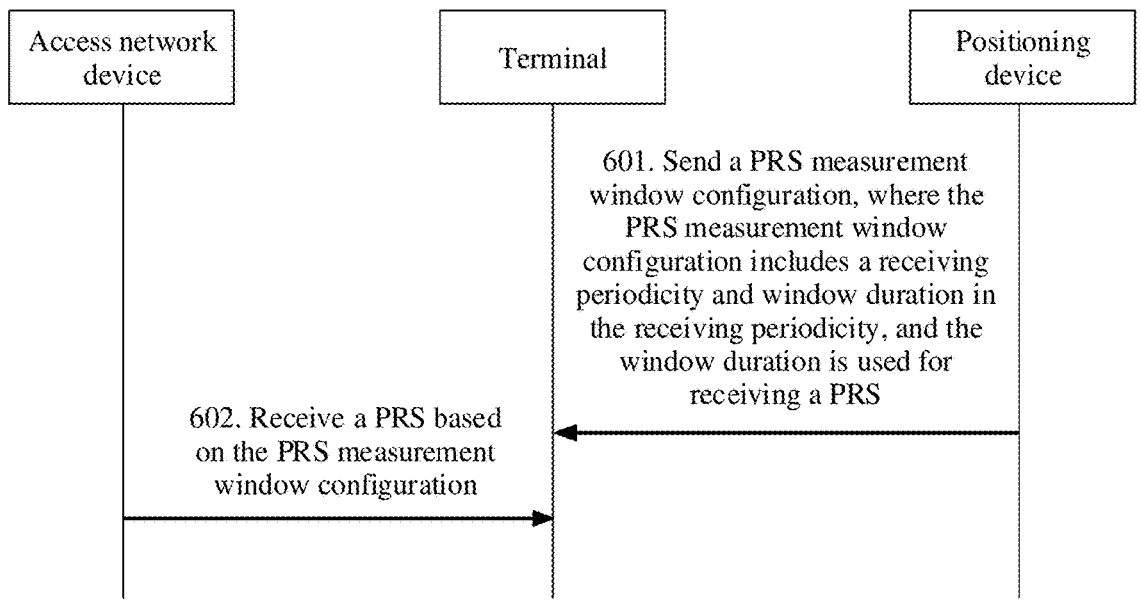
FIG. 3A is a flowchart of a method for determining to receive a PRS based on a measurement window according to an embodiment of this application.

In some cases, a manner in which the terminal receives the PRS resource may be alternatively determined in another manner. FIG. 3A is a flowchart of a method for determining to receive a PRS based on a measurement window according to an embodiment of this application. As shown in FIG. 3A, the method includes the following steps:

601. A positioning device sends a PRS measurement window configuration to a terminal, where the PRS measurement window configuration includes a receiving periodicity and window duration in the receiving periodicity, and the window duration is used for receiving a PRS.

602. The terminal receives the PRS measurement window configuration sent by the positioning device, and receives the PRS based on the PRS measurement window configuration.

In a positioning process, first, the terminal receives PRS configuration information sent by the LMF or PRS configuration information obtained through broadcasting of serving cell system information, where the configuration information may include a plurality of positioning frequencies and PRS configurations on a plurality of TRPs. One PRS configuration corresponds to at most two PRS resource sets of one TRP on one frequency, and each PRS resource set may include at most 64 PRS resources. Then, the terminal receives a RequestLocationInformation message from the LMF, through which the LMF requests the terminal to provide a measurement result. In this message, the LMF may send the PRS measurement window configuration to the terminal. The measurement window configuration includes the following:

(1) The measurement window configuration may be provided per positioning technology, or may be provided as a common configuration for a plurality of positioning technologies, where one time of positioning may trigger a plurality of positioning technologies, for example, DL-TDOA or DL-AoD.

(2) In each positioning technology or a common configuration of a plurality of positioning technologies, the window is configured per positioning frequency (one measurement window is configured for each positioning frequency), or may be configured per frequency band (one measurement window is configured for each frequency band), or may be configured per frequency range (one measurement window is configured for each FR), or may be configured individually for the terminal.

(3) A quantity of measurement windows that can be configured for each frequency, each frequency band, each frequency range, and each terminal may be one, at most two, or at most three.

Figure 3B:
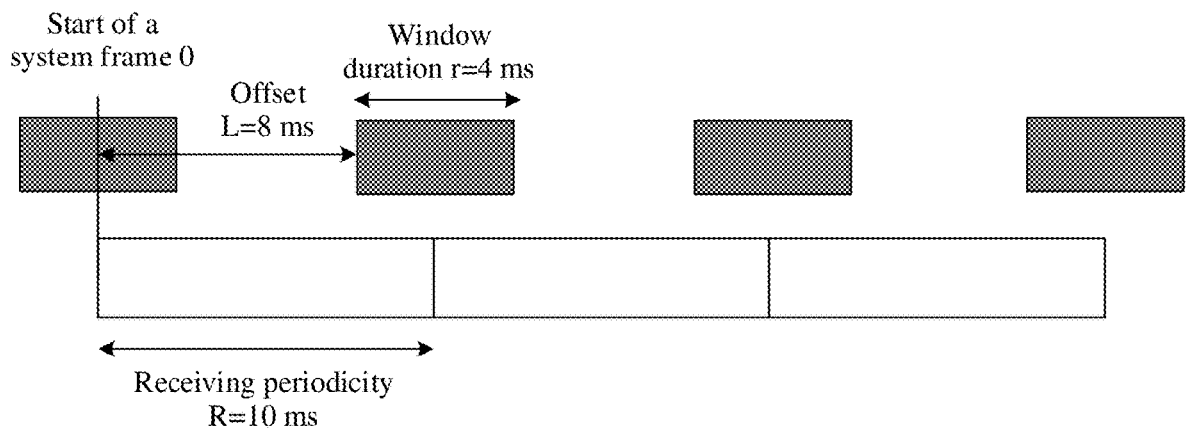
FIG. 3B is a schematic diagram of a PRS measurement window according to an embodiment of this application.

FIG. 3B is a schematic diagram of a PRS measurement window according to an embodiment of this application. As shown in FIG. 3B, one PRS measurement window includes a receiving periodicity R and window duration r in the periodicity R, indicating that the duration r corresponding to the duration R of the terminal is used to receive a PRS. PRSs in r may be consecutive or non-consecutive. Units of both R and r may be millisecond or slot. In addition, R and r may be obtained according to the method for determining time domain information of the PRS in embodiments corresponding to FIG. 2A to FIG. 2I.

Specifically, the positioning device obtains the PRS configuration information from a serving cell and/or a neighboring cell, and receives processing capability information reported by the terminal. In this case, the positioning device may obtain PRS time domain information (K, P) through calculation based on the PRS configuration information using the method in embodiments corresponding to FIG. 2A to FIG. 2I, where P is a periodicity, and K is a symbol length of the PRS in the periodicity P. Then, the PRS time domain information is compared with the processing capability information of the terminal. The processing capability information of the terminal includes a plurality of combinations of (N, T), indicating that the terminal can process a PRS of N milliseconds in a time period of T milliseconds. If the time domain information satisfies a range of at least one combination of capabilities reported by the terminal, that is, T≤P and N≥K, a configuration parameter of a PRS measurement window that may be sent to the terminal is R=P, and a setting of r ensures that a PRS length within the time period is K. Because the PRSs received in r may or may not be consecutive, r≥K.

If the time domain information (K, P) does not satisfy the range of at least one combination of capabilities reported by the terminal, a plurality of combinations of processing capability information may be searched for a second combination (N, T) so that a symbol length that can be received by the terminal satisfies N≥K. If the second combination exists, it indicates that the terminal can complete reception of a PRS with duration of more than K milliseconds in T milliseconds, and a generated measurement window configuration parameter may be: R=T. The setting of r ensures that the PRS length within the time period is K, indicating that the terminal completes, within the duration of T milliseconds, reception of a PRS with a length of K milliseconds in a window corresponding to r milliseconds. The duration of T milliseconds may include a plurality of periodicities P, and the terminal does not need to receive a PRS in all periodicities. Specially, the terminal processes only a PRS with a length of K milliseconds in one periodicity P in T milliseconds. The PRS with a length of K milliseconds is included in the window with a length of r milliseconds.

Alternatively, if the time domain information does not satisfy the range of at least one combination of capabilities reported by the terminal, the plurality of combinations of processing capability information may be searched for the second combination (N, T) so that a periodicity of a PRS received by the terminal satisfies T≤P. If the second combination exists, it indicates that when the periodicity of T milliseconds satisfies a condition, a length N of the PRS that can be received by the terminal is less than K. In this case, the generated measurement window configuration parameter may be: R=P. The setting of r ensures that a length of the PRS within the time period does not exceed N. The terminal receives the PRS based on a periodicity P corresponding to an access network device, to be specific, receives a PRS of N milliseconds and discards a PRS of (K−N) milliseconds in each periodicity P.

In another possible implementation, the terminal does not discard the remaining PRS of (K−N) milliseconds in each periodicity P, but receives all PRSs by using $$m = \text{ceil}\left(\frac{K}{N}\right)$$

periodicities P. In this case, the generated measurement window configuration parameter is still R=P. The setting of r ensures that the length of the PRS within the time period does not exceed N. In this case, the PRS is received based on the periodicity P corresponding to the access network device, to be specific, the PRS of N milliseconds is received in each P, and a PRS of K milliseconds is received in a periodicity of (m*P). It should be understood that, the terminal may process a PRS of (m*N) milliseconds in a periodicity of (m*P) milliseconds. In addition, based on $$m = \text{ceil}\left(\frac{K}{N}\right),$$

(m*N) is not less than K. Therefore, the terminal may complete reception of the PRS of K milliseconds in the periodicity of (m*P).

It can be learned that in this embodiment of this application, the positioning device obtains the PRS time domain information through calculation based on the PRS configuration information, compares the PRS time domain information with the processing capability information reported by the terminal, and determines the measurement window configuration parameter based on a comparison result. The measurement window configuration can be flexibly applied to different terminals, and the measurement window configuration can be better adapted to a capability of the terminal, improving efficiency of receiving the PRS by the terminal based on the measurement window configuration.

In addition, the PRS measurement window configuration may further include an offset, representing a time interval from the window duration to a start moment of the receiving periodicity. A unit of the offset may be ms or a slot, for example, an offset is 4 ms. Alternatively, the offset in the receiving periodicity may be determined by the terminal independently instead of being configured by the positioning device. The offset in the receiving periodicity may be jointly encoded with the receiving periodicity. Because a length of the offset does not exceed the receiving periodicity, in a receiving periodicity of 5 ms, offsets of {0 ms, 0.5 ms, 1 ms, 1.5 ms, 4.5 ms} may be defined, in a receiving periodicity of 10 ms, offsets of {0 ms, 0.5 ms, 1 ms, 9.5 ms} may be defined, in a receiving periodicity of 10 slots, only offsets of {0, 1, 2, . . . , 9} slots may be defined, and in a receiving periodicity of 20 slots, offsets of {0, 1, 2, . . . , 19} slots may be defined. As shown in FIG. 3B, a receiving periodicity R=10 ms, an offset L=8 ms, and window duration r=4 ms corresponding to the PRS measurement window configuration are given. A series of windows of a length of 4 ms that are repeated at an interval of 10 ms may be determined using a start moment of a system frame 0 as a start benchmark. The terminal determines that a start moment of a subframe 0 may be a subframe 0 corresponding to timing determined by a reference resource or a reference resource set (configured through an nr-DL-PRS-ReferenceInfo-r16 information element), or a subframe 0 corresponding to timing determined by any serving cell of the terminal on the frequency.

Alternatively, when the measurement window configuration does not include an offset, the terminal obtains, as the offset, duration from a to-be-received start PRS symbol on a target frequency to the start moment of the receiving periodicity.

After receiving the PRS measurement window configuration, the terminal performs the following behavior when receiving a PRS corresponding to a positioning technology:

If the PRS measurement window is configured per frequency, when receiving a PRS of a specific frequency, the terminal uses a PRS measurement window configuration for the frequency.

If the PRS measurement window is configured per frequency band, when receiving PRSs of a plurality of frequencies in the frequency band, the terminal uses a PRS measurement window configuration for the frequency band. If the terminal does not have a capability of receiving PRSs of a plurality of frequencies at the same time, it means that the terminal receives a PRS of only one frequency in one measurement window.

If the PRS measurement window is configured per FR, when receiving PRSs of a plurality of frequencies in the FR, the terminal uses a PRS measurement window configuration for the FR. If the terminal does not have a capability of receiving PRSs of a plurality of frequencies at the same time, it means that the terminal receives a PRS of only one frequency in one measurement window.

If the PRS measurement window is configured individually for the terminal, when receiving a plurality of frequencies (which may cross FR) of all PRSs of the positioning technology, the terminal uses a measurement window for the terminal. If the terminal does not have a capability of receiving a plurality of frequencies at the same time, it means that the terminal receives a PRS of only one frequency in one measurement window.

When there are a plurality of (two or more than two) measurement windows configured for each frequency, each frequency band, each frequency range, and each terminal, radio resource management (Radio resource management, RRM) indicators (such as a delay and accuracy) required by the terminal for PRS measurement are subject to PRS resources in the first measurement window.

Figure 3C:
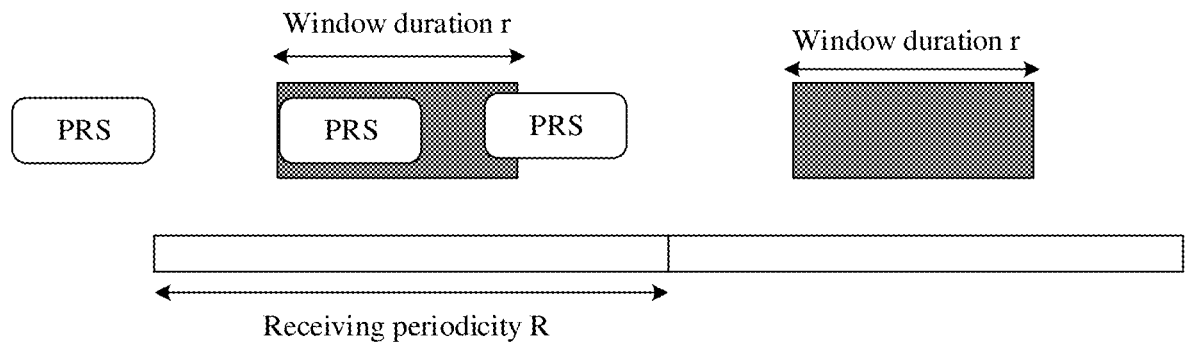
FIG. 3C is a schematic diagram of receiving a PRS based on a measurement window by a terminal according to an embodiment of this application.

In addition, FIG. 3C is a schematic diagram of receiving a PRS based on a measurement window by a terminal according to an embodiment of this application. During reception of a PRS based on the PRS measurement window configuration on a target frequency, in a target frequency band, or in a target frequency range, the terminal receives all PRSs within window duration, but does not receive a PRS outside a measurement window boundary or across the measurement window boundary.

It can be learned that, in this embodiment of this application, the positioning device sends the PRS measurement window configuration to the terminal, so that the terminal receives, based on the PRS measurement window, the PRS delivered by the access network device. In this process, consumption of a computing capability of the terminal is reduced. In addition, delivering the PRS measurement window configuration by the positioning device ensures that PRS reception is within a range of capabilities of the terminal, improving efficiency of receiving the PRS by the terminal.

It should be understood that the method embodiment corresponding to FIG. 3A to FIG. 3C may be combined with the method embodiment corresponding to FIG. 2A to FIG. 2I, or may be implemented separately. This is not limited in this embodiment of this application.

Figure 4:
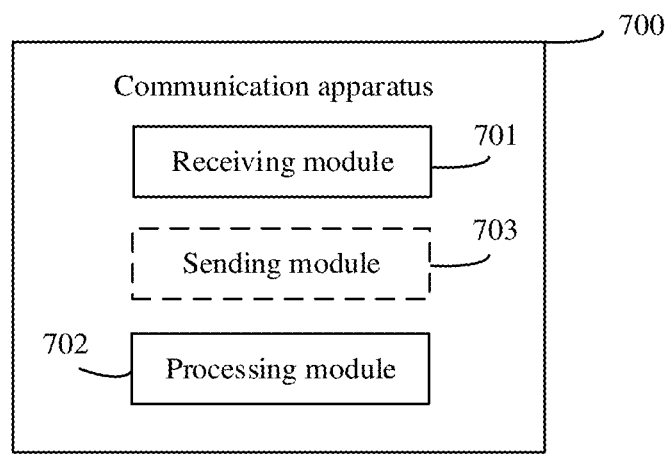
FIG. 4 is a block diagram of a structure of a communication apparatus according to an embodiment of this application.

FIG. 4 shows a communication apparatus 700 according to an embodiment of this application. The communication apparatus 700 may be configured to perform the positioning signal processing methods and specific embodiments, in FIG. 2A to FIG. 2I or FIG. 3A to FIG. 3C, that are applied to a terminal. The terminal may be a terminal device or a chip disposed on a terminal device. The terminal device includes a receiving module 701 and a processing module 702.

The receiving module 701 is configured to receive positioning reference signal PRS configuration information sent by a positioning device, where a PRS is sent in a form of a PRS resource set, each PRS resource set includes one or more PRSs, and one access network device corresponds to one or more PRS resource sets.

The processing module 702 is configured to determine PRS time domain information based on the PRS configuration information, where the time domain information includes a periodicity P of the PRS and a symbol length K of the PRS in the periodicity P.

The receiving module 701 is further configured to receive the plurality of PRSs based on the PRS time domain information.

Optionally, the receiving module 701 and the processing module 702 are further configured to implement the corresponding method in FIG. 2A to FIG. 2I.

Alternatively,
the receiving module 701 is configured to receive a PRS measurement window configuration sent by the positioning device, where the PRS measurement window configuration includes a receiving periodicity and window duration in the receiving periodicity, and the window duration is used for receiving a PRS.

The receiving module 701 is further configured to receive a PRS based on the measurement window configuration.

Optionally, the receiving module 701 and the processing module 702 are further configured to implement the corresponding method in FIG. 3A to FIG. 3C.

Optionally, the processing module 702 may be a chip, an encoder, an encoder circuit, or another integrated circuit that can implement the method in this application.

Optionally, the terminal 700 may further include a sending module 703. The receiving module 701 and the sending module 703 may be interface circuits or transceivers. The receiving module 701 and the sending module 703 may be independent modules, or may be integrated into a transceiver module (not shown in the figure). The transceiver module may implement the functions of the receiving module 701 and the sending module 703.

The specific method and embodiment have been described above, and the apparatus 700 is configured to perform the positioning signal processing method corresponding to a terminal. Therefore, for specific descriptions of the method, and in particular, functions of the receiving module 701 and the processing module 702, refer to related parts in the corresponding embodiment. Details are not described herein again.

Optionally, the apparatus 700 may further include a storage module (not shown in the figure). The storage module may be configured to store data and/or signaling. The storage module may be coupled to the processing module 702, or may be coupled to the receiving module 701 or the sending module 703. For example, the processing module 702 may be configured to read data and/or signaling in the storage module, so that the key obtaining method in the foregoing method embodiment is performed.

Figure 5:
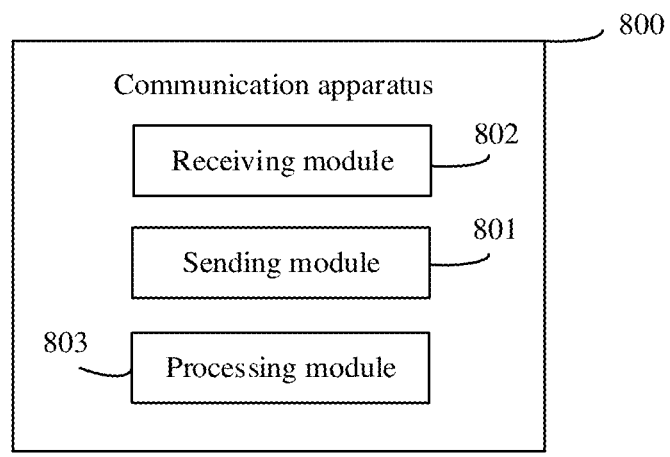
FIG. 5 is a block diagram of a structure of another communication apparatus according to an embodiment of this application.

FIG. 5 shows a communication apparatus 800 according to an embodiment of this application. The communication apparatus 800 may be configured to perform the positioning signal processing method and specific embodiments, in FIG. 2A to FIG. 2I or FIG. 3A to FIG. 3C, that are applied to a positioning device. The apparatus may be a positioning device or a chip disposed in a positioning device. In a possible implementation, as shown in FIG. 5, the communication apparatus 800 includes a sending module 801, a receiving module 802, and a processing module 803.

The sending module 801 is configured to send positioning reference signal PRS configuration information to a terminal, where a PRS is sent in a form of a PRS resource set, each PRS resource set includes one or more PRSs, and one transmission reception point, access network device, corresponds to one or more PRS resource sets.

The sending module 801 is further configured to send a measurement result request to the terminal.

The receiving module 802 is configured to receive a measurement result sent by the terminal, where the measurement result is obtained by the terminal based on PRS time domain information corresponding to the PRS configuration information, and the PRS time domain information includes a periodicity P of the PRS and a symbol length K of the PRS in the periodicity P.

The processing module 803 is configured to position the terminal based on the measurement result.

Optionally, the sending module 801, the receiving module 802, and the processing module 803 are further configured to implement the corresponding method in FIG. 2A to FIG. 2I.

Alternatively,
the receiving module 802 is configured to receive a PRS measurement window configuration sent by the positioning device, where the PRS measurement window configuration includes a receiving periodicity and window duration in the receiving periodicity, and the window duration is used for receiving a PRS.

The receiving module 802 is further configured to receive a PRS based on the measurement window configuration.

Optionally, the sending module 801, the receiving module 802, and the processing module 803 are further configured to implement the corresponding method in FIG. 3A to FIG. 3C.

Optionally, the processing module 803 may be a chip, an encoder, an encoder circuit, or another integrated circuit that can implement the method in this application.

Optionally, the receiving module 802 and the sending module 801 may be interface circuits or transceivers. The receiving module 802 and the sending module 801 may be independent modules, or may be integrated into a transceiver module (not shown in the figure). The transceiver module may implement the functions of the receiving module 802 and the sending module 801.

The specific method and embodiment have been described above, and the apparatus 800 is configured to perform the positioning signal processing method corresponding to a positioning device. Therefore, for specific descriptions of the method, and in particular, functions of the receiving module 802 and the sending module 801, refer to related parts in the corresponding embodiment. Details are not described herein again.

Optionally, the apparatus 800 may further include a storage module (not shown in the figure). The storage module may be configured to store data and/or signaling. The storage module may be coupled to the processing module 803, or may be coupled to the receiving module 802 or the sending module 801. For example, the processing module 803 may be configured to read data and/or signaling in the storage module, so that the key obtaining method in the foregoing method embodiment is performed.

Figure 6:
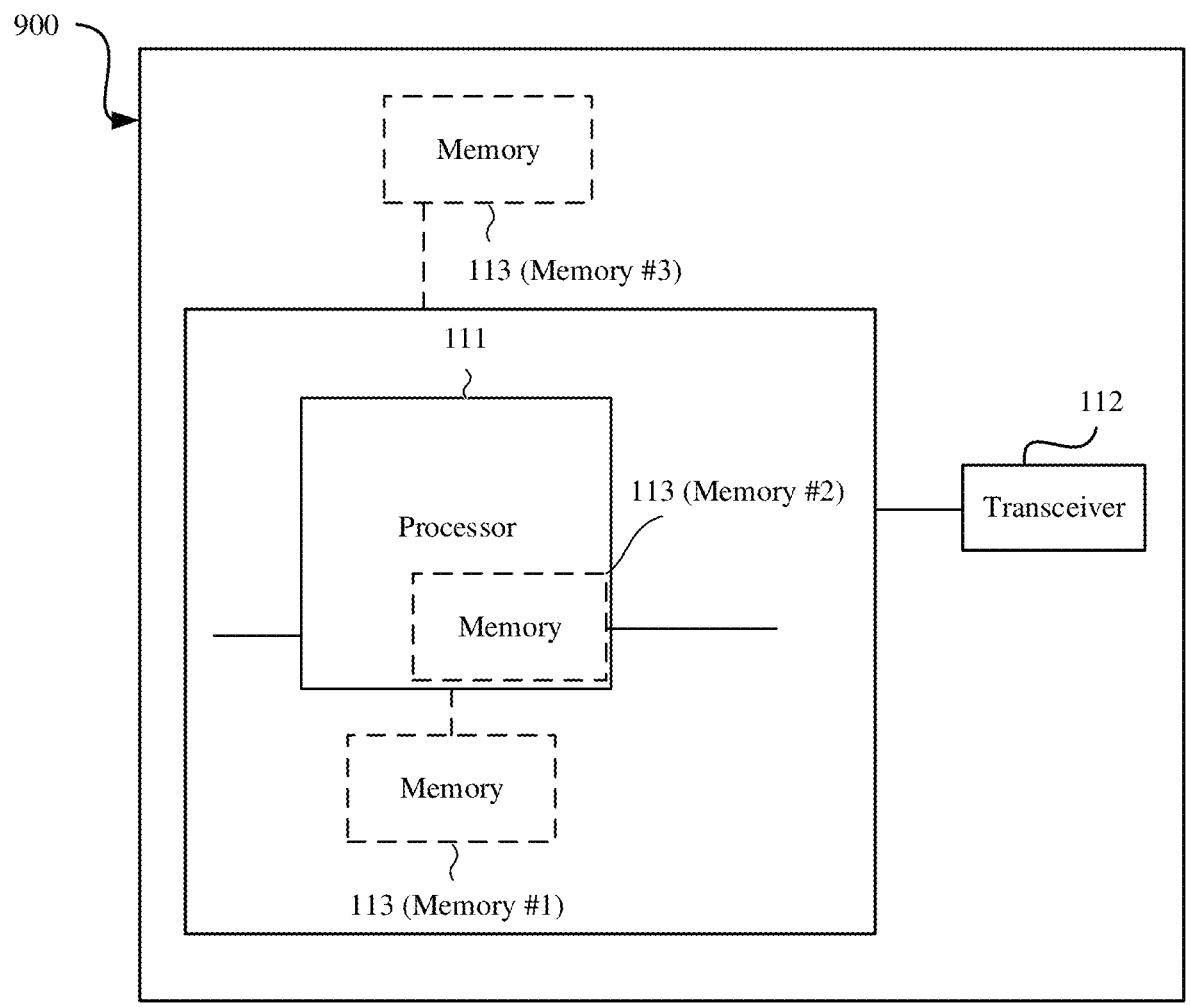
FIG. 6 is a schematic diagram of a hardware structure of a communication apparatus according to an embodiment of this application.

FIG. 6 is a schematic diagram of a hardware structure of a communication apparatus according to an embodiment of this application. For a structure of a terminal or a positioning device, refer to the structure shown in FIG. 6. The communication apparatus 900 includes a processor 111 and a transceiver 112, where the processor 111 is electrically coupled to the transceiver 112.

The processor 111 is configured to execute all or some of computer program instructions in a memory, and when the all or some of the computer program instructions are executed, the apparatus is enabled to perform the method in any one of the foregoing embodiments.

The transceiver 112 is configured to communicate with another device, for example, obtain a fourth message from an AUSF, and send a fifth message to UE based on the fourth message, to enable the UE to obtain the KID and/or the KAKMA based on the fifth message.

Optionally, a memory 113 is further included, and configured to store computer program instructions. Optionally, the memory 113 (Memory #1) is disposed in the apparatus, and the memory 113 (Memory #2) is integrated with the processor 111. Alternatively, the memory 113 (Memory #3) is disposed outside the apparatus.

It should be understood that the communication apparatus 900 shown in FIG. 6 may be a chip or a circuit, for example, a chip or a circuit that can be disposed in a terminal apparatus or a communication apparatus. The transceiver 112 may be alternatively a communication interface. The transceiver includes a receiver and a transmitter. Further, the communication apparatus 900 may further include a bus system.

The processor 111, the memory 113, and the transceiver 112 are connected through the bus system. The processor 111 is configured to execute the instructions stored in the memory 113, to control the transceiver to receive a signal and send a signal, to complete steps of the first device or the second device in the implementation method in this application. The memory 113 may be integrated into the processor 111, or may be disposed separately from the processor 111.

In an implementation, the function of the transceiver 112 may be implemented by using a transceiver circuit or a dedicated transceiver chip. The processor 111 may be implemented by using a dedicated processing chip, a processing circuit, a processor, or a general-purpose chip. The processor may be a central processing unit (central processing unit, CPU), a network processor (network processor, NP), or a combination of a CPU and an NP. The processor may further include a hardware chip or another general-purpose processor. The hardware chip may be an application-specific integrated circuit (application-specific integrated circuit, ASIC), a programmable logic device (programmable logic device, PLD), or a combination thereof. The PLD may be a complex programmable logic device (complex programmable logic device, CPLD), a field-programmable gate array (field-programmable gate array, FPGA), a generic array logic (generic array logic, GAL) and another programmable logic device, a discrete gate or a transistor logic device, a discrete hardware component, or any combination thereof. The general-purpose processor may be a microprocessor, or the processor may be any conventional processor or the like.

It should be further understood that the memory mentioned in embodiments of this application may be a volatile memory or a nonvolatile memory, or may include a volatile memory and a nonvolatile memory. The non-volatile memory may be a read-only memory (Read-Only Memory, ROM), a programmable read-only memory (Programmable ROM, PROM), an erasable programmable read-only memory (Erasable PROM, EPROM), an electrically erasable programmable read-only memory (Electrically EPROM, EEPROM), or a flash memory. The volatile memory may be a random access memory (Random Access Memory, RAM) and is used as an external cache. Through example but not limitative description, many forms of RAMs may be used, for example, a static random access memory (Static RAM, SRAM), a dynamic random access memory (Dynamic RAM, DRAM), a synchronous dynamic random access memory (Synchronous DRAM, SDRAM), a double data rate synchronous dynamic random access memory (Double Data Rate SDRAM, DDR SDRAM), an enhanced synchronous dynamic random access memory (Enhanced SDRAM, ESDRAM), a synchlink dynamic random access memory (Synchlink DRAM, SLDRAM), and a direct rambus random access memory (Direct Rambus RAM, DR RAM). It should be noted that the memory described in this application is intended to include but not limited to these memories and any memory of another appropriate type.

An embodiment of this application provides a computer storage medium storing a computer program, where the computer program includes instructions that are used to perform the method corresponding to a terminal in the foregoing embodiment.

An embodiment of this application provides a computer storage medium storing a computer program, where the computer program includes instructions that are used to perform the method corresponding to a positioning device in the foregoing embodiment.

An embodiment of this application provides a computer program product including instructions. When the computer program product runs on a computer, the computer is enabled to perform the method corresponding to a terminal in the foregoing embodiment.

An embodiment of this application provides a computer program product including instructions. When the computer program product runs on a computer, the computer is enabled to perform the method corresponding to a positioning device in the foregoing embodiment.

It should be understood that sequence numbers of the foregoing processes do not mean execution sequences in embodiments of this application. The execution sequences of the processes should be determined based on functions and internal logic of the processes, and should not constitute any limitation on implementation processes of embodiments of this application.

A person of ordinary skill in the art may be aware that, in combination with the examples described in embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the foregoing method embodiments. Details are not described herein again.

In several embodiments provided in this application, it should be understood that the disclosed system, apparatus, and method may be implemented in another manner. For example, the described apparatus embodiment is merely an example. For example, division into the units is merely logical function division and may be other division during actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electrical, mechanical, or another form.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of embodiments.

In addition, functional units in embodiments of this application may be integrated into one processing unit, each of the units may exist alone physically, or two or more units may be integrated into one unit.

When the functions are implemented in a form of a software functional unit and sold or used as an independent product, the functions may be stored in a computer-readable storage medium. Based on such an understanding, the technical solutions of this application essentially, or the part contributing to a conventional technology, or some of the technical solutions may be implemented in a form of a software product. The computer software product is stored in a storage medium, and includes several instructions for instructing a computer device (which may be a personal computer, a server, a network device, or the like) to perform all or some of the steps of the methods described in embodiments of this application. The foregoing storage medium includes: any medium that can store program code, such as a USB flash drive, a removable hard disk, a read-only memory (Read-Only Memory, ROM), a random access memory (Random Access Memory, RAM), a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A positioning signal processing method, wherein the method comprises:
   receiving positioning reference signal (PRS) configuration information from a positioning device, wherein a PRS is received as a PRS resource set, each PRS resource set comprises one or more PRSs, and one access network device corresponds to one or more PRS resource sets;
   determining PRS time domain information based on the PRS configuration information, wherein the time domain information comprises a periodicity (P) of the PRS and a symbol length of the PRS in the P;
   receiving a plurality of PRSs based on the PRS time domain information;
   wherein the determining the PRS time domain information based on the PRS configuration information comprises: determining a symbol length of a PRS in a first slot set, wherein the determining the symbol length of the PRS in the first slot set comprises:
      determining a first symbol length of a PRS in each slot in the first slot set; and
      determining the symbol length of the PRS in the first slot set based on the first symbol length;
   configuring the symbol length of the PRS in the first slot set as the symbol length of the PRS in the P,
      wherein the first slot set comprises a plurality of slots, and the plurality of slots are useable to transmit each PRS of the plurality of PRSs detected by the terminal device within a duration corresponding to the P.

2. The method according to claim 1, wherein the determining PRS time domain information based on the PRS configuration information comprises:
   P is a common sending periodicity of a plurality of PRS resource sets corresponding to a plurality of access network devices;
   P is a common sending periodicity of first PRS resource sets corresponding to each access network device in the plurality of access network devices;
   P is a sending periodicity of a first PRS resource set corresponding to a first access network device in the plurality of access network devices, wherein the sending periodicity of the first PRS resource set corresponding to the first access network device in the plurality of access network devices is a common divisor of sending periodicities of the first PRS resource sets corresponding to each access network device in the plurality of access network devices;
   P is a greatest common divisor of a set of common divisors of the sending periodicities of the first PRS resource sets corresponding to each access network device in the plurality of access network devices;
   P is a greatest common divisor of a set of common divisors of sending periodicities of a plurality of PRS resource sets corresponding to each access network device in the plurality of access network devices;
   P is a least common multiple of a set of common multiples of the sending periodicities of the first PRS resource sets corresponding to each access network device in the plurality of access network devices; or
   P is a least common multiple of a set of common multiples of the sending periodicities of the plurality of PRS resource sets corresponding to each access network device in the plurality of access network devices.

3. The method according to claim 1, wherein the determining the first symbol length of the PRS in each slot in the first slot set comprises:
   determining a start moment and an end moment of each slot in the first slot set; and
   determining the first symbol length of the PRS in each slot in the first slot set based on the start moment and the end moment.

4. The method according to claim 3, wherein the determining the first symbol length of the PRS in each slot in the first slot set based on the start moment and the end moment comprises:
   determining the first symbol length of the PRS in each slot based on a first OFDM symbol determined at a first PRS subcarrier spacing corresponding to the start moment and a second OFDM symbol determined at a second PRS subcarrier spacing corresponding to the end moment.

5. The method according to claim 4, wherein the first symbol length of the PRS satisfies a following formula:

$$K_s = \frac{1}{2^\mu N_{symb}^{slot}} \left( \text{ceil}\left(2^\mu N_{symb}^{slot} T_s^{end}\right) - \text{floor}\left(2^\mu N_{symb}^{slot} T_s^{start}\right) \right)$$

wherein s is a slot index in the first slot set, $K_s$ represents the first symbol length of the PRS in a slot having the slot index s, µ is a subcarrier spacing corresponding to the PRS, $N_{symb}^{slot}$ is a quantity of symbols in one slot, $T_s^{start}$ is a start moment in the slot having the slot index s, and $T_s^{end}$ is an end moment in the slot having the slot index s.

6. The method according to claim 3, wherein the determining the first symbol length of the PRS in each slot in the first slot set based on the start moment and the end moment comprises:
obtaining a time interval between the start moment and the end moment; and
determining the first symbol length of the PRS in each slot in the first slot set based on a symbol length corresponding to an OFDM symbol determined at a PRS subcarrier spacing corresponding to the time interval.

7. The method according to claim 6, wherein the first symbol length of the PRS satisfies a following formula:

$$K_s = \frac{1}{2^\mu N_{symb}^{slot}} \text{ceil}\left(2^\mu N_{symb}^{slot}\left(T_s^{end} - T_s^{start}\right)\right)$$

wherein s is a slot index in the first slot set, $K_s$ represents the first symbol length of the PRS in a slot having the slot index s, µ is a subcarrier spacing corresponding to the PRS, $N_{symb}^{slot}$ is a quantity of symbols in one slot, $T_s^{start}$ is a start moment in the slot having the slot index s, and $T_s^{end}$ is an end moment in the slot having the slot index s.

8. The method according to claim 6, wherein the time interval between the start moment and the end moment comprises a range in which each of PRS symbols sent by each access network device in the slot appears.

9. The method according to claim 8, wherein the time interval between the start moment and the end moment is a minimum time interval of a set of time intervals.

10. The method according to claim 8, wherein
the range in which each of the PRS symbols sent by each access network device in the slot appears is a union set of ranges in which each of the PRS symbols of each transmission reception point (TRP) appear, and
the range in which each of the PRS symbols sent by each access network device is determined based on an expected reference signal receiving time difference, an uncertain range of the expected reference signal receiving time difference, a symbol index occupied by the PRS, and a quantity of symbols sent by each access network device.

11. The method according to claim 1, wherein the method further comprises: determining a symbol length of the PRS in the first slot, wherein the determining the symbol length of the PRS in the first slot set comprises:
determining slot lengths corresponding to slots in the first slot set; and
performing summation on the slot lengths corresponding to the slots in the first slot set to obtain the symbol length of the PRS in the first slot set.

12. The method according to claim 11, wherein the symbol length of the PRS in the first slot set satisfies a following formula:

$$K = \frac{|S|}{2^\mu}$$

wherein K represents the symbol length of the PRS, |S| represents taking a quantity of elements in the set, and µ represents a subcarrier spacing.

13. A communication apparatus, comprising:
a transceiver;
a processor; and
a non-transitory computer-readable storage medium coupled to the processor, and configured to store non-transitory instructions, the processor being configured to execute the non-transitory instructions, to thereby cause the communication apparatus to:
receive positioning reference signal (PRS) configuration information from a positioning device, wherein a PRS is received as a PRS resource set, each PRS resource set comprises one or more PRSs, and one access network device corresponds to one or more PRS resource sets;
determine PRS time domain information based on the PRS configuration information, wherein the time domain information comprises a periodicity (P) of the PRS and a symbol length of the PRS in the P;
receive a plurality of PRSs based on the PRS time domain information;
wherein the processor configured to execute the non-transitory instructions, to thereby cause the communication apparatus to determine the PRS time domain information based on the PRS configuration information, comprises:
determine a symbol length of a PRS in a first slot set, wherein the determining the symbol length of the PRS in the first slot set comprises the communication apparatus to:
determine a first symbol length of a PRS in each slot in the first slot set; and
determine the symbol length of the PRS in the first slot set based on the first symbol length;
configure the symbol length of the PRS in the first slot set as the symbol length of the PRS in the P,
wherein the first slot set comprises a plurality of slots, and the plurality of slots are useable to transmit each PRS of the plurality of PRSs detected by the terminal device within a duration corresponding to the P.

14. The communication apparatus according to claim 13, wherein the first symbol length of the PRS satisfies a following formula:

$$K_s = \frac{1}{2^\mu N_{symb}^{slot}} \text{ceil}\left(2^\mu N_{symb}^{slot}\left(T_s^{end} - T_s^{start}\right)\right)$$

wherein s is a slot index in the first slot set, $K_s$ represents the first symbol length of the PRS in a slot having the slot index s, µ is a subcarrier spacing corresponding to the PRS, $N_{symb}^{slot}$ is a quantity of symbols in one slot, $T_s^{start}$ is a start moment in the slot having the slot index s, and $T_s^{end}$ is an end moment in the slot having the slot index s.

15. The communication apparatus according to claim 13, wherein
the processor is further configured to execute the non-transitory instructions, to further cause the communication apparatus to: determine a symbol length of the PRS in a first slot set, wherein the determining the symbol length of the PRS in the first slot set comprises the communication apparatus to:
determine slot lengths corresponding to slots in the first slot set; and
perform summation on the slot lengths corresponding to the slots in the first slot set to obtain the symbol length of the PRS in the first slot set.

16. The communication apparatus according to claim 15, wherein the symbol length of the PRS in the first slot set satisfies a following formula:

$$K = \frac{|S|}{2^\mu}$$

wherein K represents the symbol length of the PRS, |S| represents taking a quantity of elements in the set, and µ represents a subcarrier spacing.

17. A communication system, wherein the system comprises a terminal, a positioning device, and an access network device, the terminal comprises a communication apparatus comprising:
a transceiver;
a processor; and
a non-transitory computer-readable storage medium coupled to the processor, and configured to store non-transitory instructions, the processor being configured to execute the non-transitory instructions, to thereby cause the communication apparatus to:
receive positioning reference signal (PRS) configuration information from a positioning device, wherein a PRS is received as a PRS resource set, each PRS resource set comprises one or more PRSs, and one access network device corresponds to one or more PRS resource sets;
determine PRS time domain information based on the PRS configuration information, wherein the time domain information comprises a periodicity (P) of the PRS and a symbol length of the PRS in the P;
receive a plurality of PRSs based on the PRS time domain information;
wherein the processor configured to execute the non-transitory instructions, to thereby cause the communication apparatus to determine the PRS time domain information based on the PRS configuration information, comprises:
determine a symbol length of a PRS in a first slot set, wherein the determining the symbol length of the PRS in the first slot set comprises the communication apparatus to:
determine a first symbol length of a PRS in each slot in the first slot set; and
determine the symbol length of the PRS in the first slot set based on the first symbol length;
configure the symbol length of the PRS in the first slot set as the symbol length of the PRS in the P,
wherein the first slot set comprises a plurality of slots, and the plurality of slots are useable to transmit each PRS of the plurality of PRSs detected by the terminal device within a duration corresponding to the P.

\* \* \* \* \*